United States Patent
Ichikawa et al.

(10) Patent No.: US 7,923,866 B2
(45) Date of Patent: Apr. 12, 2011

(54) POWER SUPPLY SYSTEM AND VEHICLE INCLUDING THE SAME, AND METHOD OF CONTROLLING THE SAME

(75) Inventors: Shinji Ichikawa, Toyota (JP); Eiji Sato, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 155 days.

(21) Appl. No.: 12/312,745

(22) PCT Filed: Dec. 5, 2007

(86) PCT No.: PCT/JP2007/073900
§ 371 (c)(1),
(2), (4) Date: May 26, 2009

(87) PCT Pub. No.: WO2008/081691
PCT Pub. Date: Jul. 10, 2008

(65) Prior Publication Data
US 2010/0065349 A1    Mar. 18, 2010

(30) Foreign Application Priority Data

Jan. 4, 2007  (JP) ................. 2007-000140
Jun. 19, 2007 (JP) ................. 2007-161492

(51) Int. Cl.
*B60K 1/00* (2006.01)
*H02J 1/10* (2006.01)

(52) U.S. Cl. ............ 307/82; 307/9.1; 307/10.1; 307/29

(58) Field of Classification Search ............... 307/9.1, 307/10.1, 10.7, 25, 29, 82
See application file for complete search history.

(56) References Cited

U.S. PATENT DOCUMENTS

| 6,608,396 | B2  | 8/2003  | Downer et al. |
| 6,710,575 | B2  | 3/2004  | Youn |
| 7,750,505 | B2* | 7/2010  | Ichikawa ............... 307/82 |
| 7,795,844 | B2* | 9/2010  | Ichikawa et al. ........ 320/134 |
| 7,847,432 | B2* | 12/2010 | Ichikawa ............... 307/45 |

FOREIGN PATENT DOCUMENTS

| JP | A-7-274378   | 10/1995 |
| JP | A-2002-10502 | 1/2002  |
| JP | A-2003-134606| 5/2003  |

(Continued)

OTHER PUBLICATIONS

Russian Office Action issued in Russian Patent Application No. 2009129688/07(041357) dated Jun. 8, 2010 (with translation).
Korean Office Action issued in Korean Patent Application No. 10-2009-7016114 on Nov. 16, 2010 (with translation).

*Primary Examiner* — Fritz M Fleming
(74) *Attorney, Agent, or Firm* — Oliff & Berridge, PLC

(57) ABSTRACT

When power storage units and are both in a normal condition, system relays are maintained in an ON state. A converter performs a voltage conversion operation in accordance with a voltage control mode, and a converter performs a boost operation in accordance with an electric power control mode. If some kind of fault condition occurs in the power storage unit and the system relay is driven to an OFF state, the converters stop the voltage conversion operation and maintain an electrically conducting state between the power storage units and a main positive bus, a main negative bus.

13 Claims, 19 Drawing Sheets

FOREIGN PATENT DOCUMENTS

| | | |
|---|---|---|
| JP | A-2003-209932 | 7/2003 |
| JP | A-2003-309997 | 10/2003 |
| JP | A-2004-6138 | 1/2004 |
| JP | A-2006-158173 | 6/2006 |
| JP | A-2006-288129 | 10/2006 |
| JP | A-2006-333552 | 12/2006 |
| RU | 2 025 862 C1 | 12/1994 |
| WO | WO 2005/105511 A1 | 11/2005 |

* cited by examiner

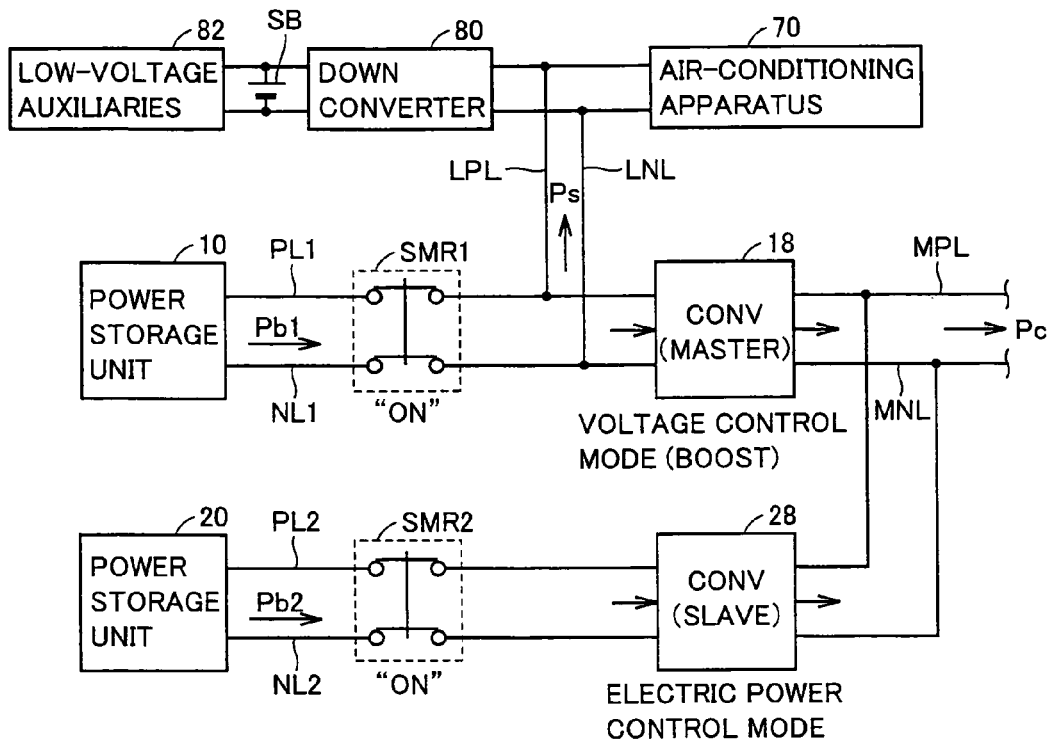
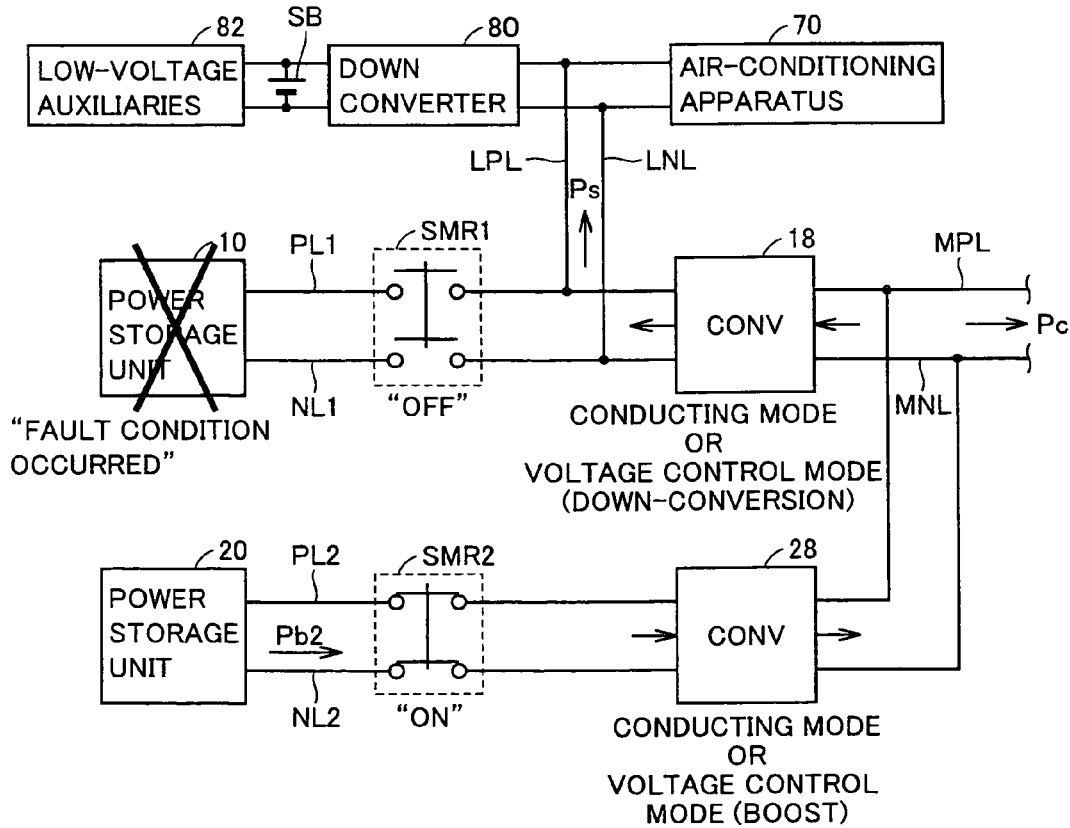

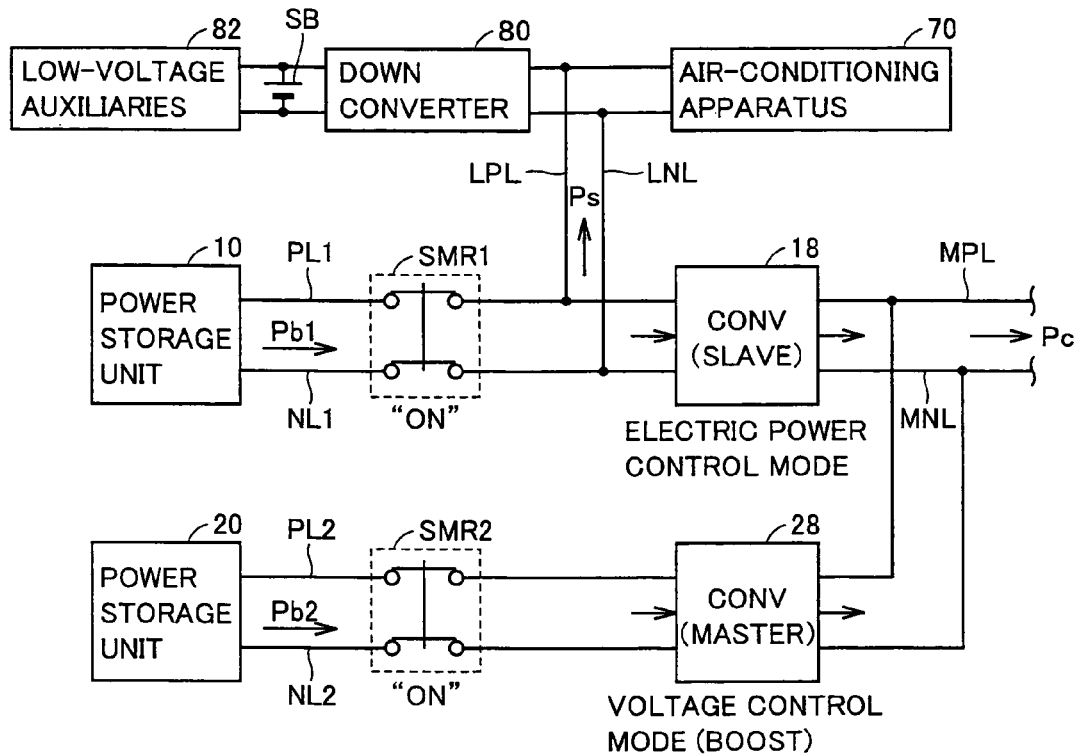
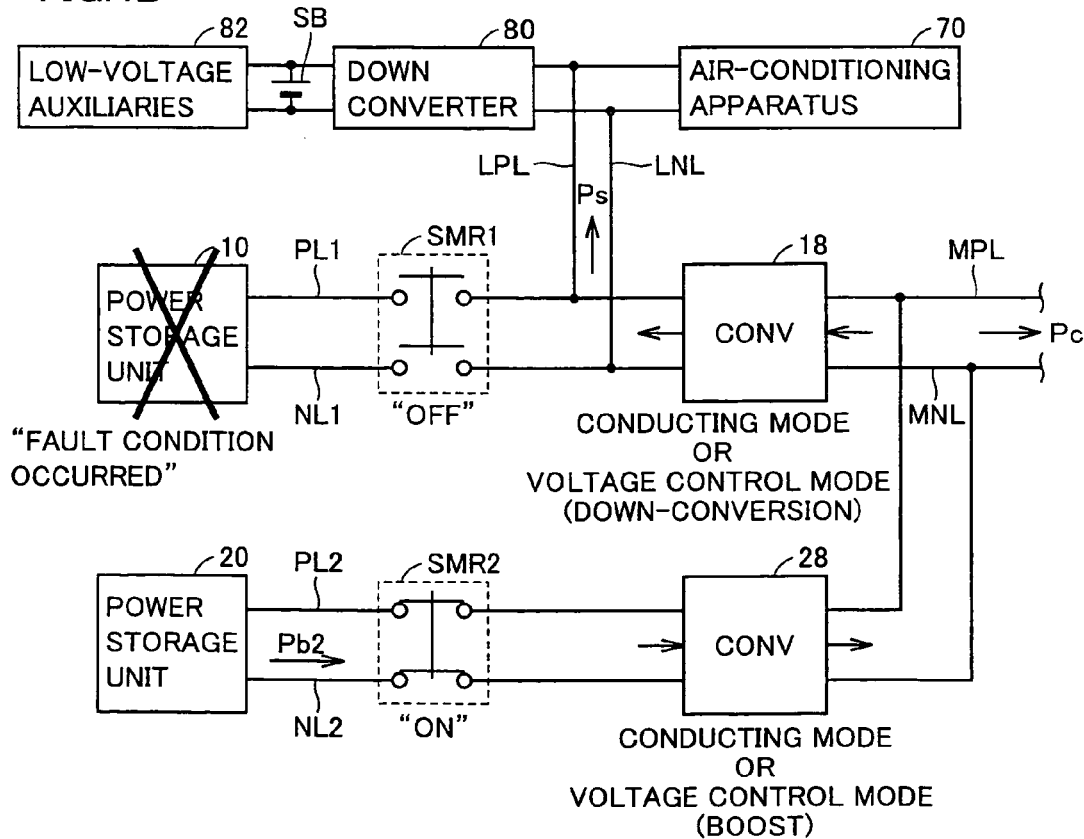

FIG.11
VOLTAGE CONTROL
MODE (BOOST)
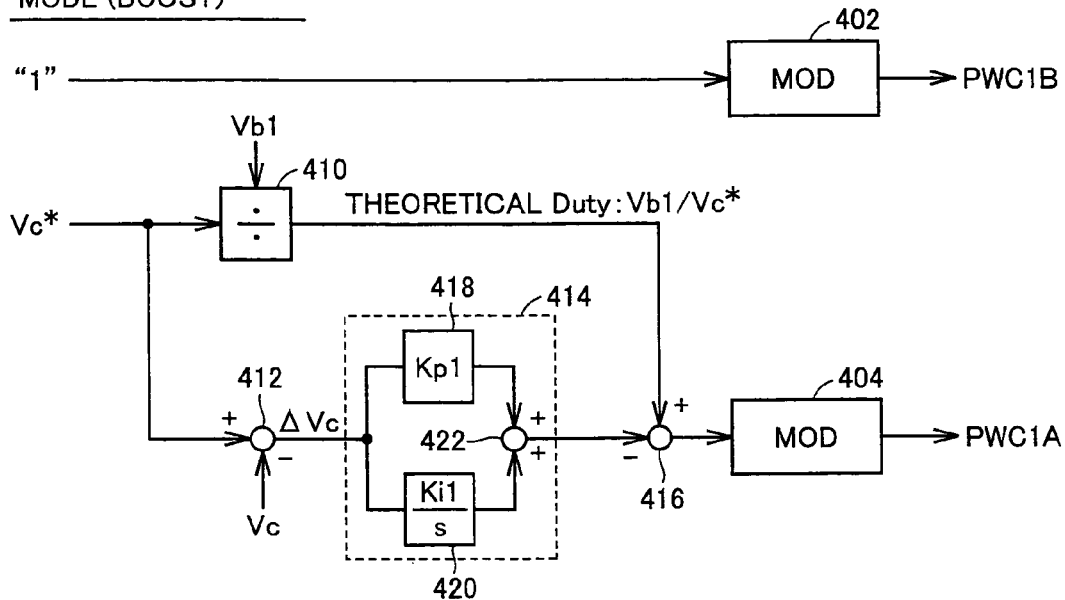
ELECTRIC POWER
CONTROL MODE
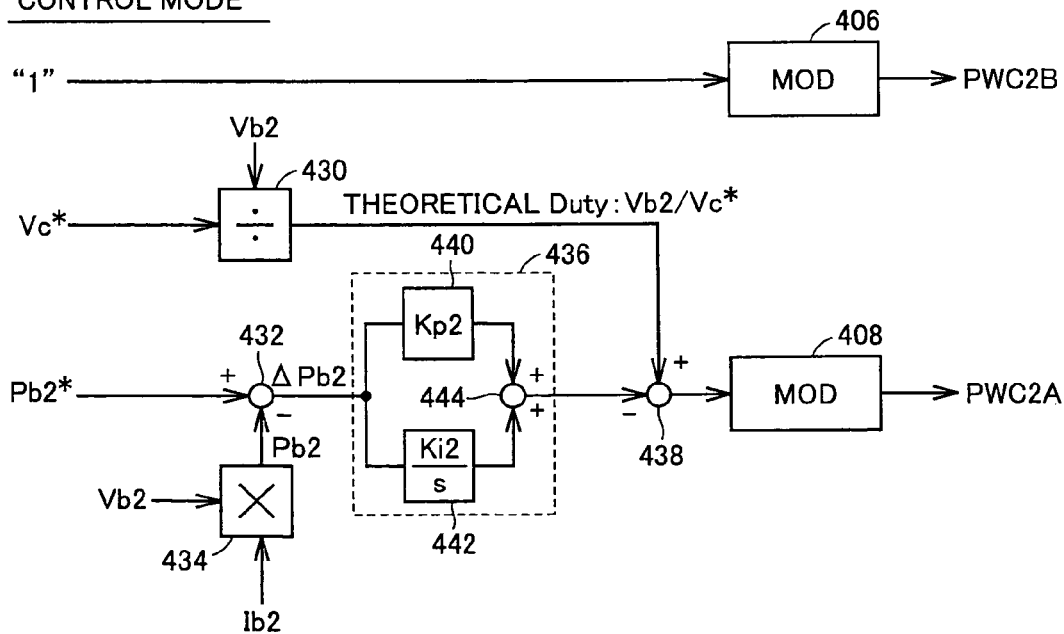

FIG.12
ELECTRIC POWER
CONTROL MODE
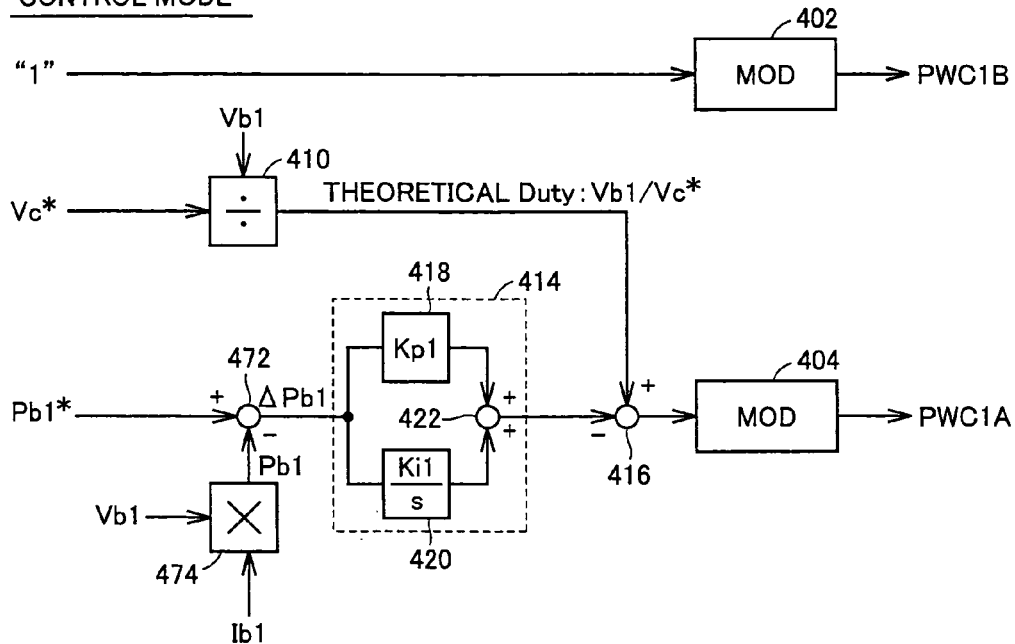
VOLTAGE CONTROL
MODE (BOOST)
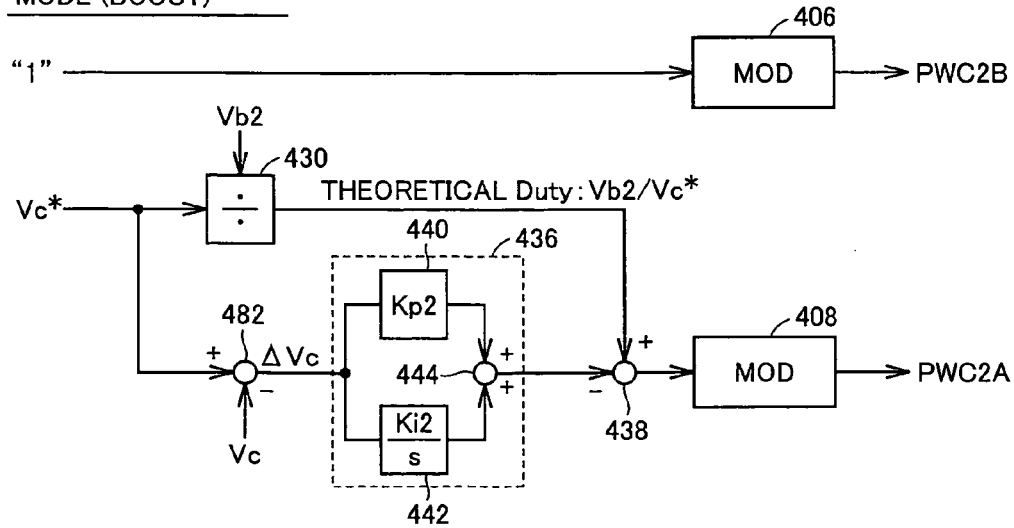

FIG.13
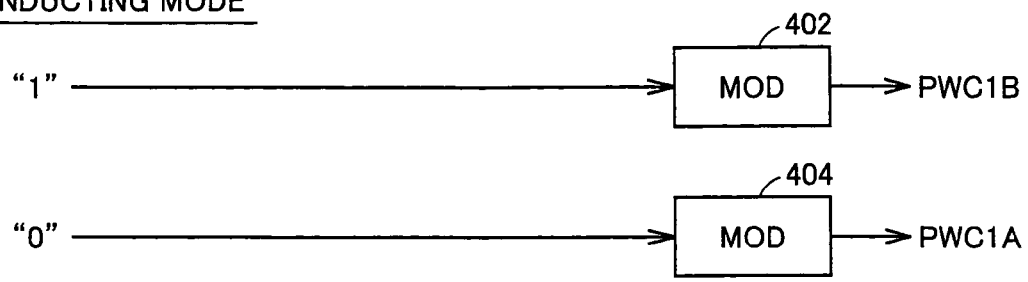
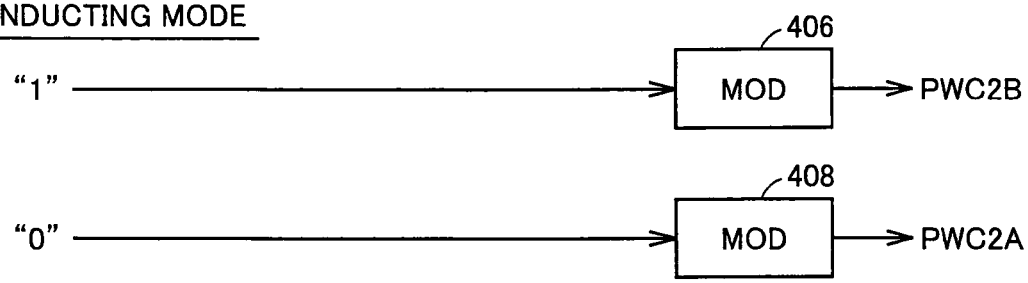

FIG.14
VOLTAGE CONTROL MODE (BOOST)
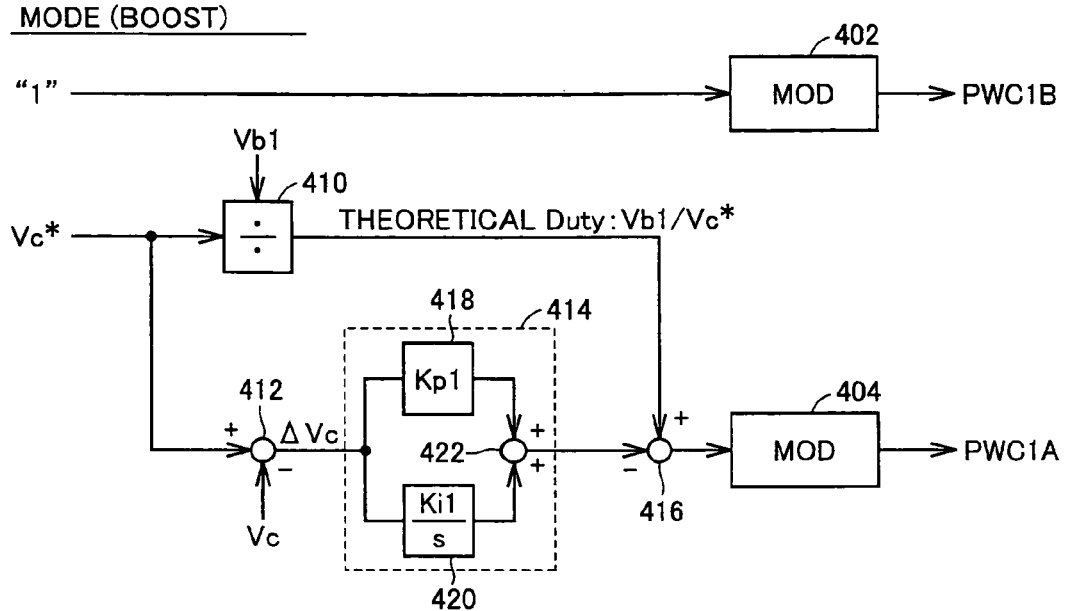
OPEN MODE
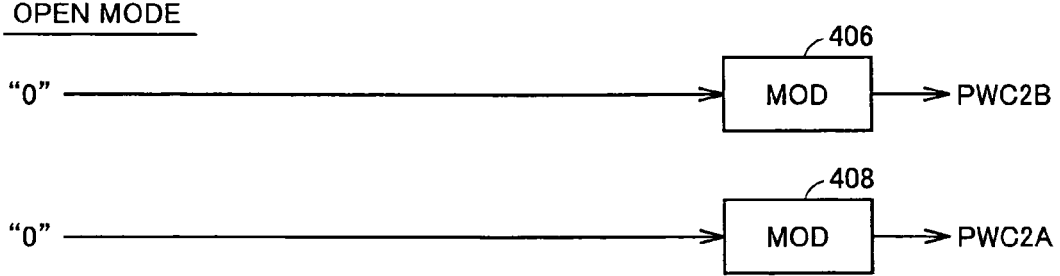

FIG.18
VOLTAGE CONTROL
MODE (DOWN-CONVERSION)
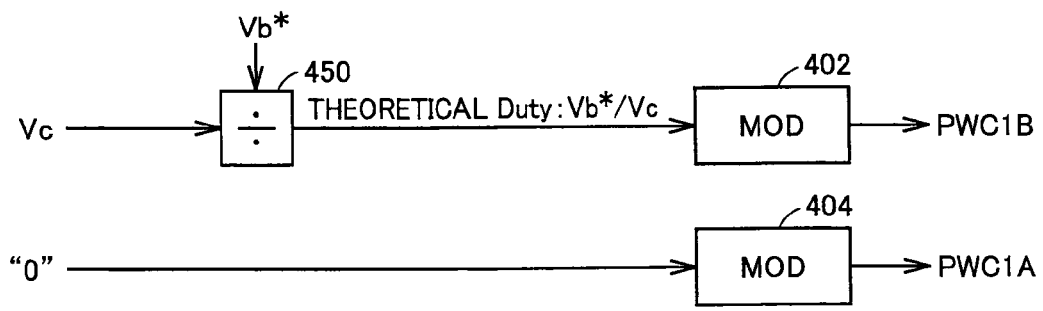
VOLTAGE CONTROL
MODE (BOOST)
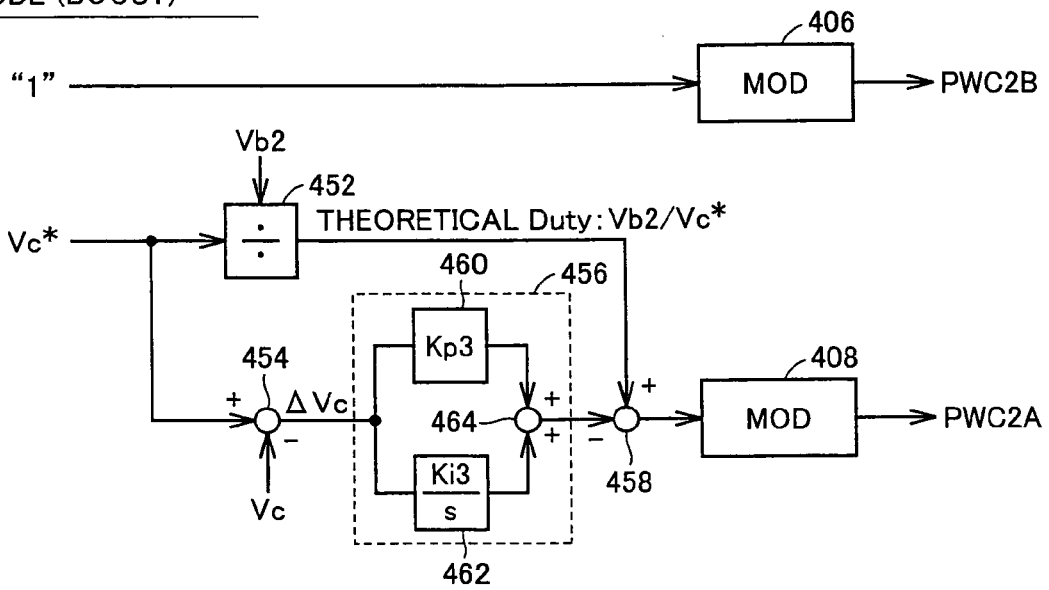

POWER SUPPLY SYSTEM AND VEHICLE INCLUDING THE SAME, AND METHOD OF CONTROLLING THE SAME

TECHNICAL FIELD

The present invention relates to a power supply system having a plurality of power storage units and a vehicle including the same, and a method of controlling the same, and particularly to a control technique in a case where a power storage unit is disconnected from the power supply system.

BACKGROUND ART

Recently, considering environmental issues, a hybrid vehicle that runs based on efficient combination of an engine and a motor has been put into practical use. Such a hybrid vehicle includes a power storage unit that can be charged or discharged and generates drive force by supplying electric power to a motor at the time of start or acceleration while it recovers kinetic energy of the vehicle as electric power during running down a slope or during braking. Therefore, a nickel metal hydride battery, a lithium-ion battery or the like adapted to large input/output electric power and charge/discharge capacity has been adopted as the power storage unit included in a hybrid vehicle.

A configuration called "plug-in" allowing charge/discharge of a power storage unit by using external power supply such as commercial power supply has been proposed for such a hybrid vehicle. The plug-in configuration aims to enhance overall fuel consumption efficiency by driving a relatively short distance, for example for commuting or shopping, with electric power stored in advance in the power storage unit from the external power supply while the engine is maintained in a non-operating state.

In a running mode using only electric power from the power storage unit, that is, in what is called an EV (Electric Vehicle) running mode, steady output of electric power is necessary. Accordingly, a charge/discharge capacity greater than that of a power storage unit included in a normal hybrid vehicle is required in the power storage unit in the plug-in configuration, whereas input/output electric power thereof may be relatively small.

Thus, in a hybrid vehicle adapted to the plug-in configuration, power storage units different in performance are necessary. Therefore, a configuration including a plurality of power storage units different in a charge/discharge characteristic is desirable. Regarding a configuration incorporating a plurality of power storage units, for example, U.S. Pat. No. 6,608,396 discloses a power control system providing desired high DC voltage levels required by a high voltage vehicle traction system. The power control system includes a plurality of power stages for providing DC power to at least one inverter, each stage including a battery and boost/buck DC-DC converter, the power stages wired in parallel, and a controller controlling the plurality of power stages so as to maintain a voltage output to at least one inverter by causing uniform charge/discharge of the batteries of the plurality of power stages.

In general, the power storage unit stores a relatively large amount of electric energy. Accordingly, from the viewpoint of safety, the power storage unit is always monitored for a fault condition based on a status value of the power storage unit. For example, a degree of deterioration is determined based on an internal resistance value of the power storage unit. If determination as fault is made, the power storage unit should electrically be disconnected from the system.

In the power control system disclosed in U.S. Pat. No. 6,608,396 described above, no attention is paid to a case where a fault condition occurs in a battery (power storage unit), and a configuration for electrically disconnecting the power storage unit where a fault condition occurs is not disclosed. Therefore, if only one of a plurality of power storage units is in the fault condition, the entire system should inevitably be stopped.

DISCLOSURE OF THE INVENTION

The present invention was made to solve such problems, and an object of the present invention is to provide a power supply system capable of continuing supply of electric power to a load device even when any power storage unit among a plurality of power storage units is electrically disconnected for some reason, a vehicle including the same, and a method of controlling the same.

According to one aspect of the present invention, a power supply system for supplying electric power to first and second load devices is provided. The power supply system includes a first electric power line pair electrically connected to the first load device, a plurality of rechargeable power storage units, and a plurality of voltage conversion units arranged corresponding to the plurality of power storage units respectively. The plurality of voltage conversion units are connected in parallel to the first electric power line pair and each of the plurality of voltage conversion units is configured to perform a voltage conversion operation between the first electric power line pair and the corresponding power storage unit. The power supply system further includes a plurality of disconnection units arranged corresponding to the plurality of power storage units respectively, each for electrically disconnecting the corresponding power storage unit and the corresponding voltage conversion unit from each other, a second electric power line pair having one end electrically connected between a first voltage conversion unit representing one of the plurality of voltage conversion units and the corresponding disconnection unit and another end electrically connected to the second load device, and a control unit. The control unit controls the plurality of voltage conversion units, when one disconnection unit among the plurality of disconnection units electrically disconnects corresponding the power storage unit and corresponding the voltage conversion unit from each other, such that electric power supply to the first load device and electric power supply to the second load device are continued through the first electric power line pair and through the second electric power line pair respectively by using electric power from remaining power storage unit.

Preferably, the power supply system further includes a fault condition detection unit for detecting a fault condition for each of the plurality of power storage units. Each of the plurality of disconnection units is configured to electrically disconnect the corresponding power storage unit and the corresponding voltage conversion unit from each other in response to detection of a fault condition in the corresponding power storage unit by the fault condition detection unit.

Preferably, the fault condition detection unit detects a fault condition of each of the plurality of power storage units based on at least one of a temperature, a voltage value, a current value, and an internal resistance value of the corresponding power storage unit.

Preferably, the control unit controls the voltage conversion unit corresponding to the remaining power storage unit such that electric power from the remaining power storage unit is supplied to the first load device through the first electric power line pair and controls the first voltage conversion unit such that electric power is supplied from the first electric power line pair through the second electric power line pair to the second load device, when the first voltage conversion unit and the corresponding power storage unit are electrically disconnected from each other by the corresponding disconnection unit.

Further preferably, the control unit stops an electric power conversion operation between the first electric power line pair and the corresponding power storage unit and thereafter sets an electrically conducting state therebetween, for each of the plurality of voltage conversion units.

Further preferably, each of the plurality of voltage conversion units includes a switching element connected in series to an inductor and arranged between one electric power line out of the first electric power line pair and one electrode of the corresponding power storage unit, capable of electrically connecting and disconnecting one electric power line and one electrode of the corresponding power storage unit to/from each other, and a line for electrically connecting another electric power line out of the first electric power line pair and another electrode of the corresponding power storage unit to each other. The control unit maintains a conducting state by setting the switching element to an ON state, for each of the plurality of voltage conversion units.

In addition, preferably, the control unit controls the remaining voltage conversion unit except for the first voltage conversion unit such that electric power from the corresponding power storage unit is supplied to the first electric power line pair after it is boosted, and controls the first voltage conversion unit such that electric power from the first electric power line pair is supplied to the second load device after it is down-converted.

Further preferably, the control unit controls the first voltage conversion unit in accordance with a first control mode for attaining a value of a down-converted voltage supplied to the second load device to a prescribed target value.

Further preferably, the control unit controls at least one of the remaining voltage conversion units in accordance with a second control mode for attaining a value of a boosted voltage supplied to the first electric power line pair to a prescribed target value.

Further preferably, while the first voltage conversion unit and the corresponding power storage unit are electrically connected to each other, the first voltage conversion unit is set to the second control mode to perform a voltage conversion operation, and each remaining voltage conversion unit is set to a third control mode for attaining a value of electric power supplied and received between the first electric power line pair and the corresponding power storage unit to a prescribed target value to perform a voltage conversion operation. The control unit switches between the control modes for at least one of the remaining voltage conversion units and the first voltage conversion unit in response to electrical disconnection between the first voltage conversion unit and the corresponding power storage unit by the corresponding disconnection unit.

According to another aspect of the present invention, a vehicle including the power supply system described above and a drive force generation unit for generating drive force for running as the first load device is provided.

Preferably, the vehicle further includes an auxiliary machinery group for vehicle as the second load device.

According to yet another aspect of the present invention, a method of controlling a power supply system for supplying electric power to first and second load devices is provided. The power supply system includes a first electric power line pair electrically connected to the first load device, a plurality of rechargeable power storage units, and a plurality of voltage conversion units arranged corresponding to the plurality of power storage units respectively. The plurality of voltage conversion units are connected in parallel to the first electric power line pair and each of the plurality of voltage conversion units is configured to perform a voltage conversion operation between the corresponding power storage unit and the first electric power line pair. The power supply system further includes a plurality of disconnection units arranged corresponding to the plurality of power storage units respectively, each for electrically disconnecting the corresponding power storage unit and the corresponding voltage conversion unit from each other, and a second electric power line pair having one end electrically connected between a first voltage conversion unit representing one of the plurality of voltage conversion units and the corresponding disconnection unit and another end electrically connected to the second load device. The method includes the steps of: detecting whether a fault condition is present or not for each of the plurality of power storage units; electrically disconnecting, when the fault condition of any one power storage unit among the plurality of power storage units is detected, the power storage unit of which fault condition has been detected and the corresponding voltage conversion unit from each other by using the corresponding disconnection unit; and controlling the plurality of voltage conversion units such that electric power supply to the first load device and electric power supply to the second load device are continued through the first electric power line pair and through the second electric power line pair respectively by using electric power from the remaining power storage unit except for the disconnected power storage unit.

According to the present invention, a power supply system capable of continuing supply of electric power to a load device even when any power storage unit among a plurality of power storage units is electrically disconnected for some reason, a vehicle including the same, and a method of controlling the same can be obtained.

BRIEF DESCRIPTION OF THE DRAWINGS

FIGS. 3A and 3B are diagrams showing outlines (case 1) of electric power supply to a drive force generation unit and an auxiliary machinery group according to the first embodiment of the present invention.

FIGS. 4A and 4B are diagrams showing outlines (case 2) of electric power supply to the drive force generation unit and the auxiliary machinery group according to the first embodiment of the present invention.

FIG. 11 is a block diagram showing a control structure of a control system (for normal condition) corresponding to FIGS. 3A and 5A.

FIG. 12 is a block diagram showing a control structure of the control system (for normal condition) corresponding to FIGS. 4A and 6A.

FIG. 13 is a block diagram showing a control structure of a control system (for fault condition) corresponding to FIGS. 3B and 4B.

FIG. 14 is a block diagram showing a control structure of the control system (for fault condition) corresponding to FIGS. 5B and 6B.

FIG. 18 is a block diagram showing a control structure of a control system (for fault condition) corresponding to FIGS. 3B and 4B.

BEST MODES FOR CARRYING OUT THE INVENTION

Figure 1:
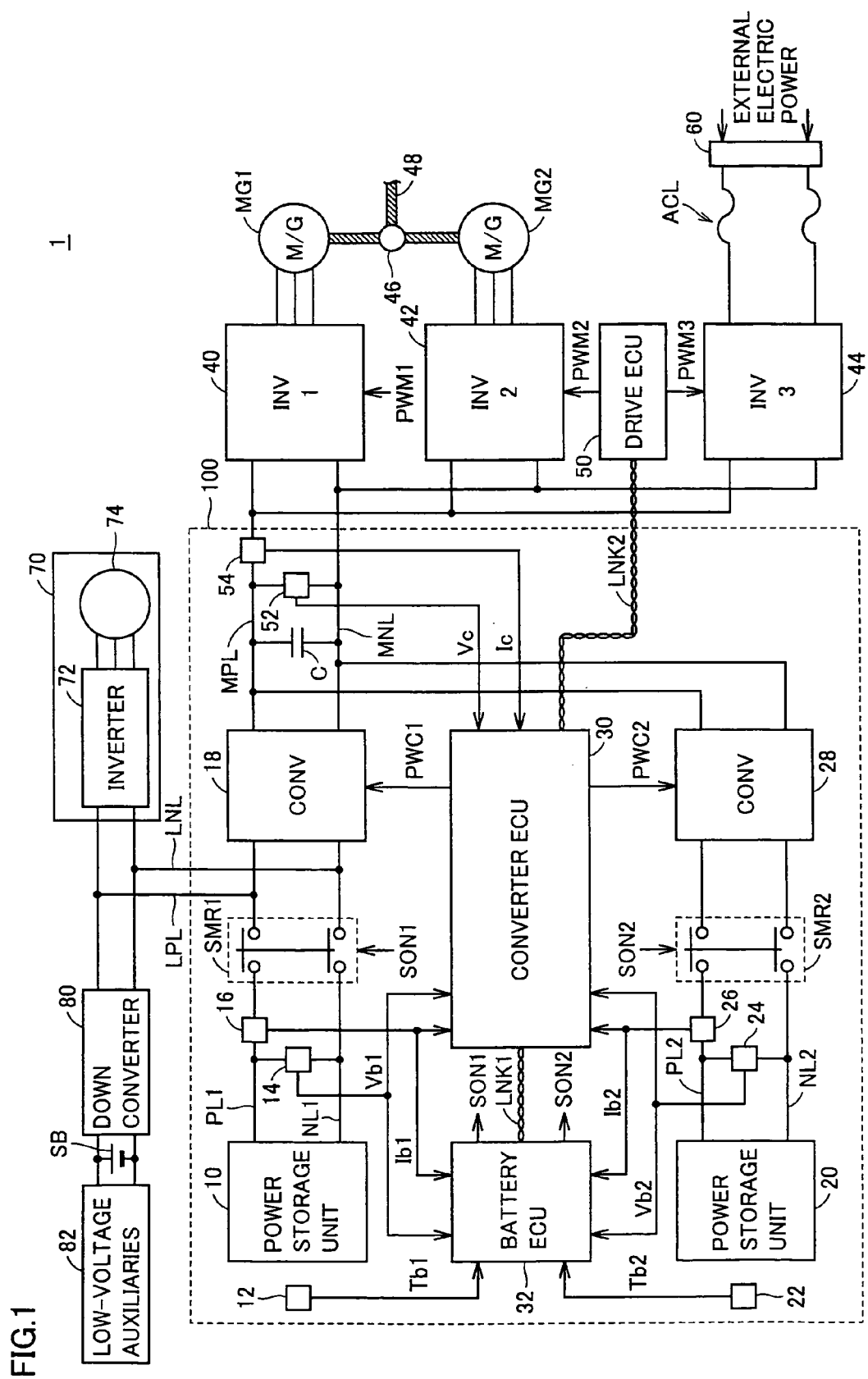
FIG. 1 is a schematic configuration diagram showing a substantial part of a vehicle including a power supply system according to a first embodiment of the present invention.

An embodiment of the present invention will be described in detail with reference to the drawings. It is noted that the same or corresponding elements in the drawings have the same reference characters allotted and description thereof will not be repeated.

First Embodiment (Configuration of Vehicle)

FIG. 1 is a schematic configuration diagram showing a substantial part of a vehicle 1 including a power supply system 100 according to a first embodiment of the present invention.

Referring to FIG. 1, vehicle 1 includes power supply system 100, a first inverter (INV1) 40, a second inverter (INV2) 42, a third inverter (INV3) 44, motor-generators (M/G) MG1, MG2, a drive ECU (Electronic Control Unit) 50, an air-conditioning apparatus 70, low-voltage auxiliaries 82, a down converter 80, and a sub power storage unit SB.

In the present first embodiment, power supply system 1 including two power storage units 10, 20 will be described by way of example of the power supply system including a plurality of power storage units.

Inverters 40, 42, motor-generators MG1, MG2, and drive ECU 50 constitute a "drive force generation unit" for generating drive force for running vehicle 1. The "drive force generation unit" herein is illustrated as a "first load device."

Namely, vehicle 1 runs by transmitting to wheels (not shown), drive force generated by electric power supplied to the drive force generation unit from power supply system 100. In addition, air-conditioning apparatus 70, low-voltage auxiliaries 82, down converter 80, and sub power storage unit SB constitute an "auxiliary machinery group" for vehicle. The "auxiliary machinery group" herein is illustrated as a "second load device."

A configuration capable of continuing electric power supply not only to the "drive force generation unit" corresponding to the "first load device" but also to the "auxiliary machinery group" even when any "power storage unit" is electrically disconnected from the power supply system is illustrated herein. Various situations where the "power storage unit" should electrically be disconnected are assumed. In the present first and second embodiments and variations thereof, an example where it is determined that the power storage unit should electrically be disconnected from the power supply system because the power storage unit is in a fault condition is illustrated.

(Configuration of Drive Force Generation Unit)

Inverters 40, 42 are connected in parallel to a main positive bus MPL and a main negative bus MNL forming a first electric power line pair, and supply/receive electric power to/from power supply system 100. That is, inverters 40, 42 convert electric power (DC electric power) supplied through main positive bus MPL and main negative bus. MNL to AC electric power and supply the AC electric power to motor-generators MG1, MG2 respectively. Meanwhile, inverters 40, 42 convert AC electric power generated by motor-generators MG1, MG2 to DC electric power and return the resultant DC electric power as regenerative electric power to power supply system 100. For example, inverters 40, 42 are constituted of a bridge circuit including switching elements of three phases, and perform electric power conversion by performing a switching (circuit opening/closing) operation in response to switching instructions PWM1, PWM2 received from drive ECU 50.

Motor-generators MG1, MG2 are configured to be able to generate rotational drive force by receiving AC electric power supplied from inverters 40, 42 respectively and to be able to generate electric power by receiving external rotational drive force. For example, motor-generators MG1, MG2 are implemented by a three-phase AC electric rotating machine including a rotor having permanent magnets embedded. Motor-generators MG1, MG2 are mechanically connected to a not-shown engine via a power split device 46.

Drive ECU 50 performs operational processing such that an optimal ratio between the drive force generated by the engine and the drive force generated by motor-generators MG1, MG2 is attained. More specifically, drive ECU 50 executes a program stored in advance, so as to determine drive force to be generated in the engine and motor-generators MG1, MG2 based on a signal transmitted from each not-shown sensor, a running state, variation in an accelerator position, a stored map, or the like. It is noted that motor-generator MG1 may serve solely as the generator while motor-generator MG2 may serve solely as the motor.

(Configuration of Auxiliary Machinery Group)

Air-conditioning apparatus 70 is an apparatus for mainly air-conditioning a passenger room in a vehicle, and includes an inverter 72 connected to a low-voltage positive line LPL and a low-voltage negative line LNL forming a second power supply line pair and a compressor 74 driven by inverter 72. Inverter 72 converts DC electric power supplied from power supply system 100 to AC electric power and supplies the AC electric power to compressor 74. Compressor 74 is an apparatus for achieving air-conditioning by generating heat of vaporization through a refrigeration cycle (not shown) in which compression and expansion of a coolant (such as chlorofluorocarbons) are repeated, and compresses the coolant with rotational drive force generated by the AC electric power supplied from inverter 72.

Low-voltage auxiliaries 82 are collective denotation of auxiliaries that are driven at a voltage lower (for example, 12V or 24V) than a voltage value (for example, 288V) of electric power supplied from power supply system 100. For example, low-voltage auxiliaries 82 include a car navigation system, a car audio system, an interior light, an indicator within a vehicle, and the like. In addition, low-voltage auxiliaries 82 are driven by DC electric power at a low voltage supplied from down converter 80 or sub power storage unit SB.

Down converter 80 is a device for down-converting electric power supplied from power supply system 100. Down converter 80 is connected to low-voltage positive line LPL and low-voltage negative line LNL and supplies down-converted DC electric power to low-voltage auxiliaries 82 and sub power storage unit SB. For example, down converter 80 is implemented by what is called a "trans"-type circuit that converts DC electric power to AC electric power, performs voltage conversion by using a winding transformer, and converts again the voltage-converted AC electric power to DC electric power.

Sub power storage unit SB is implemented, for example, by a lead-acid battery, connected to an output side of down converter 80, and charged with output DC electric power, while it supplies charged electric power to low-voltage auxiliaries 82. Namely, sub power storage unit SB also has a function as an electric power buffer for compensating for unbalance between output electric power from down converter 80 and electric power demanded by low-voltage auxiliaries 82.

(Plug-in Configuration)

In addition, in the present first embodiment, inverter 44 is connected to main positive bus MPL and main negative bus MNL, in parallel to inverters 40, 42. Inverter 44 is a charging device for charging power storage units 10, 20 included in power supply system 100 by using external electric power from outside the vehicle. Specifically, inverter 44 is electrically connected to a commercial power supply (not shown) in a house or the like outside the vehicle through a charge connector 60 and a supply line ACL such that electric power can be received from the external power supply. Then, inverter 44 converts the electric power from the external power supply to DC electric power for supply to power supply system 100. For example, inverter 44 is representatively implemented by a single-phase inverter so as to adapt to a manner of electric power feed of the commercial power supply used in the house (not shown) outside the vehicle.

The plug-in configuration is not limited to the configuration shown in FIG. 1, and the configuration may be such that electrical connection with an external power supply is established through neutral points of motor-generators MG1 and MG2.

(Configuration of Power Supply System)

Power supply system 100 includes a smoothing capacitor C, power storage units 10, 20, converters (CONV) 18, 28, temperature detection units 12, 22, voltage detection units 14, 24, 52, current detection units 16, 26, 54, system relays SMR1, SMR2, a battery ECU 32, and a converter ECU 30.

Smoothing capacitor C is connected between main positive bus MPL and main negative bus MNL, and reduces a fluctuating component contained in electric power supplied or received between power supply system 100 and the drive force generation unit.

Voltage detection unit 52 is connected between main positive bus MPL and main negative bus MNL, detects a bus voltage value Vc indicating a voltage value of electric power supplied and received between power supply system 100 and the drive force generation unit, and outputs the result of detection to converter ECU 30. In addition, current detection unit 54 is inserted in main positive bus MPL, detects a bus current value Ic indicating a current value of electric power supplied and received between power supply system 100 and the drive force generation unit, and outputs the result of detection to converter ECU 30.

Power storage units 10, 20 are elements for storing chargeable/dischargeable DC electric power, and for example, they are implemented by a secondary battery such as a nickel metal hydride battery or a lithium-ion battery, or by an electric double layer capacitor.

Converters 18 and 28 are voltage conversion units connected in parallel to main positive bus MPL and main negative bus MNL and configured to perform an electric power conversion operation between corresponding power storage units 10, 20 and main positive bus MPL, main negative bus MNL, respectively. More specifically, converters 18 and 28 boost discharged electric power from respective corresponding power storage units 10, 20 to a prescribed voltage for supply to the drive force generation unit, while they down-convert regenerative electric power supplied from the drive force generation unit to a prescribed voltage for charging respective corresponding power storage units 10, 20. For example, converters 18, 28 are both implemented by a "chopper" type circuit.

Temperature detection units 12, 22 are arranged in the proximity of battery cells and the like constituting power storage units 10, 20 respectively, detect temperatures Tb1, Tb2 of power storage units 10, 20, and output the result of detection to battery ECU 32. It is noted that temperature detection units 12, 22 may be configured to output a representative value obtained based on values detected by a plurality of detection elements arranged in correspondence with a plurality of battery cells constituting power storage units 10, 20.

Voltage detection unit 14 is connected between a positive line PL1 and a negative line NL1 electrically connecting power storage unit 10 to converter 18, detects a voltage value Vb1 involved with input and output to/from power storage unit 10, and outputs the result of detection to battery ECU 32 and converter ECU 30. Similarly, voltage detection unit 24 is connected between a positive line PL2 and a negative line NL2 electrically connecting power storage unit 20 to converter 28, detects a voltage value Vb2 involved with input and output to/from power storage unit 20, and outputs the result of detection to battery ECU 32 and converter ECU 30.

Current detection units 16, 26 are inserted in positive lines PL1, PL2 connecting power storage units 10, 20 to converters 18, 28 respectively, detect current values Ib1, Ib2 involved with charge/discharge of corresponding power storage units 10, 20 respectively, and output the result of detection to battery ECU 32 and converter ECU 30.

System relay SMR1 is inserted in positive line PL1 and negative line NL1 electrically connecting power storage unit 10 and converter 18 to each other, and electrically connects or disconnects power storage unit 10 and converter 18 to/from each other in response to a system ON instruction SON1 from battery ECU 32 which will be described later. In the description below, an electrically connected state is also referred to as the "ON" state, and an electrically disconnected state is also referred to as the "OFF" state.

In addition, low-voltage positive line LPL and low-voltage negative line LNL are connected to positive line PL1 and negative line NL1 at a position between system relay SMR1 and converter 18, respectively. Thus, a part of electric power that flows through positive line PL1 and negative line NL1 can be supplied to the auxiliary machinery group for vehicle. If system relay SMR1 is in a disconnection state, power storage unit 10 is electrically disconnected from the drive force generation unit and the auxiliary machinery group.

Similarly, system relay SMR2 is inserted in positive line PL2 and negative line NL2 electrically connecting power storage unit 20 and converter 28 to each other, and electrically connects or disconnects power storage unit 20 and converter 28 to/from each other in response to a system ON instruction SON2 from battery ECU 32 which will be described later.

Thus, in the present first embodiment, system relays SMR1, SMR2 correspond to the "plurality of disconnection units."

Battery ECU 32 is a device for monitoring and controlling power storage units 10, 20, and maintains a state of charge (SOC; hereinafter also referred to as "SOC") of power storage units 10, 20 within a prescribed range in coordination with converter ECU 30 connected through a control line LNK1. Specifically, battery ECU 32 calculates SOC of power storage units 10, 20 based on temperatures Tb1, Tb2 received from temperature detection units 12, 22, voltage values Vb1, Vb2 received from voltage detection units 14, 24, and current values Ib1, Ib2 received from current detection units 16, 26.

In addition, battery ECU 32 detects a fault condition for each of power storage units 10, 20 based on temperatures Tb1, Tb2, voltage values Vb1, Vb2, current values Ib1, Ib2, an internal resistance value, and the like of power storage units 10, 20. If power storage units 10, 20 are both in a normal condition, battery ECU 32 activates system ON instructions SON1, SON2 in response to an ignition ON instruction (not shown) issued by a driver's operation, and drives system relays SMR1, SMR2 to the ON state. On the other hand, if a fault condition has occurred in any of power storage units 10 and 20, battery ECU 32 determines that electrical disconnection is necessary, inactivates corresponding system ON instruction SON1, SON2, and electrically disconnects corresponding power storage unit 10, 20 from power supply system 100.

Converter ECU 30 controls the electric power conversion operation in converters 18, 28 such that an electric power value requested by the drive force generation unit can be allotted to power storage units 10 and 20 at a prescribed ratio, in coordination with battery ECU 32 connected through control line LNK1 and drive ECU 50 connected through a control line LNK2. Specifically, converter ECU 30 provides switching instructions PWC1, PWC2 in accordance with a control mode selected in advance from among a plurality of control modes which will be described later, for respective converters 18, 28.

In particular, in power supply system 100 according to the present first embodiment, when power storage units 10, 20 are both in a normal condition, any one of converters 18 and 28 operates as "master" and the other one operates as "slave". The converter operating as "master" is controlled in accordance with a "voltage control mode (boost)" for setting a voltage value of electric power supplied from power supply system 100 to the drive force generation unit (bus voltage value Vc across main positive bus MPL and main negative bus MNL) to a prescribed voltage target value. On the other hand, the converter operating as "slave" is controlled in accordance with an "electric power control mode" for setting electric power allotted to the corresponding power storage unit (electric power supplied and received between that power storage unit and main positive bus MPL, main negative bus MNL) out of electric power supplied from power supply system 100 to the drive force generation unit to a prescribed electric power target value. Here, a part of electric power discharged from power storage unit 10 is supplied to the auxiliary machinery group.

Here, when a fault condition occurs in power storage unit 10 and power storage unit 10 is electrically disconnected from power supply system 100, converter 28 continues the voltage conversion operation such that electric power supply from power storage unit 20 to the drive force generation unit is continued, while converter 18 performs the voltage conversion operation such that a part of electric power that flows through main positive bus MPL, main negative bus MNL is supplied to the auxiliary machinery group. Here, converter 28 corresponding to power storage unit 20 should operate as "master". Accordingly, if converter 28 is operating as "slave" immediately before power storage unit 10 is electrically disconnected, mode switching is made such that converter 28 operates as "master" simultaneously with electrical disconnection of power storage unit 10.

In contrast, if a fault condition takes place in power storage unit 20 and power storage unit 20 is electrically disconnected from power supply system 100, converter 18 performs the voltage conversion operation such that electric power supply from power storage unit 10 to the drive force generation unit and the auxiliary machinery group is continued, while converter 28 stops the voltage conversion operation. Here, converter 18 corresponding to power storage unit 10 should operate as "master". Accordingly, if converter 18 is operating as "slave" immediately before power storage unit 20 is electrically disconnected, mode switching is made such that converter 18 operates as "master" simultaneously with electrical disconnection of power storage unit 20.

As described above, in the present embodiment, even when a fault condition takes place in any one of power storage units 10 and 20, electric power supply to the drive force generation unit and the auxiliary machinery group can be continued.

In the present embodiment, converter ECU 30 corresponds to the "control unit", and battery ECU 32 corresponds to the "fault condition detection unit."

(Configuration of Converter)

Figure 2:
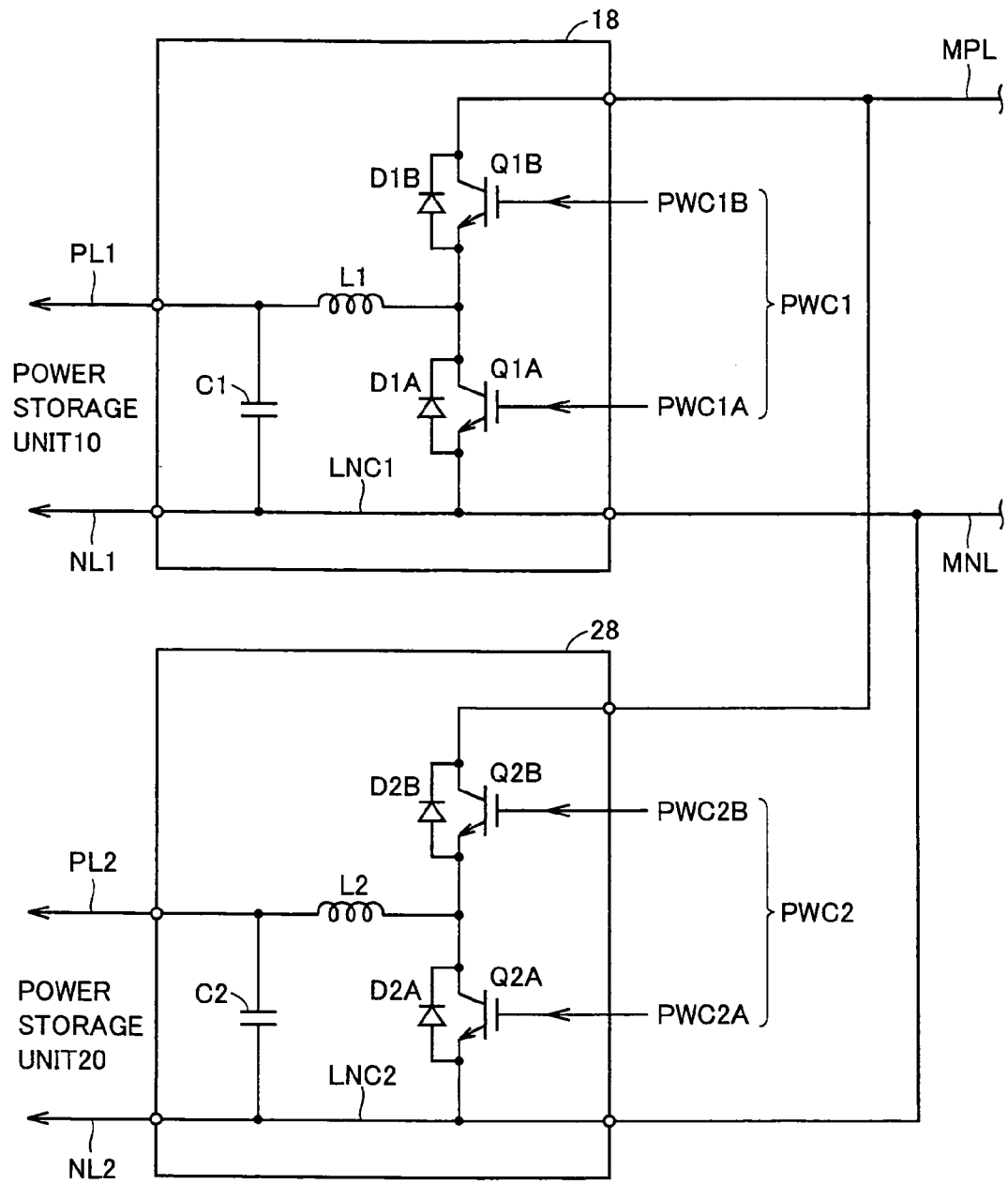
FIG. 2 is a schematic configuration diagram of a converter according to the first embodiment of the present invention.

Referring to FIG. 2, converter 18 according to the first embodiment of the present invention, during discharge from power storage unit 10, boosts DC electric power supplied from power storage unit 10, while converter 18, during charging to power storage unit 10, down-converts DC electric power supplied through main positive bus MPL and main negative bus MNL, in response to switching instruction PWC1 from converter ECU 30 (FIG. 1). Converter 18 includes transistors Q1A, Q1B serving as a switching element, an inductor L1, a line LNC1, diodes D1A, D1B, and a smoothing capacitor C1.

Transistor Q1B is connected in series to inductor L1 and arranged between positive line PL1 (positive electrode side of power storage unit 10) and main positive bus MPL. Transistor Q1B has a collector connected to positive bus MPL. Transistor Q1B electrically connects or disconnects positive line PL1 and main positive bus MPL to/from each other in response to a second switching instruction PWC1B included in switching instruction PWC1. Line LNC1 electrically connects negative line NL1 (negative electrode side of power storage unit 10) and main negative bus MNL to each other. Transistor Q1A is further connected between a connection point of transistor Q1B and inductor L1 and line LNC1. Transistor Q1A has an emitter connected to line LNC1. Transistor Q1A electrically connects or disconnects positive line PL1 and negative line NL1 in response to a first switching instruction PWC1A included in switching instruction PWC1.

In addition, diodes D1A, D1B allowing a current flow from the emitter sides to the collector sides are connected between the collectors and the emitters of transistors Q1A, Q1B, respectively. Moreover, smoothing capacitor C1 is connected between positive line PL1 and negative line NL1 (or line LNC1), and reduces the AC component contained in the electric power supplied and received between power storage unit 10 and converter 18. Further, when system relay SMR1 (FIG. 1) makes transition from the OFF state to the ON state and power storage unit 10 and converter 18 are electrically connected to each other, smoothing capacitor C1 is charged until it substantially attains to a voltage value of power storage unit 10. Thus, smoothing capacitor C1 also achieves an effect to prevent failure of transistor Q1A, Q1B, diode D1A, D1B or the like due to an inrush current that is produced at the moment of transition of system relay SMR1 (FIG. 1) to the ON state.

The voltage conversion operation (boost operation and down-conversion operation) of converter 18 will be described hereinafter.

During the boost operation, converter ECU 30 (FIG. 1) maintains transistor Q1B in the ON state (duty ratio=100%) and turns ON/OFF transistor Q1A at a prescribed duty ratio lower than 100%. In the following, the duty ratio is also denoted as "Duty".

While transistor Q1A is in the ON state (conducting state), a first current path from the positive electrode side of power storage unit 10 to main positive bus MPL and a second current path from the positive electrode side of power storage unit 10 through inductor L1 back to the negative electrode side are formed. Here, a pump current that flows through the second current path is stored as electromagnetic energy in inductor L1. As transition from the ON state to the OFF state (non-conducting state) of transistor Q1A is made, the second current path is opened and the pump current is cut off. Then, as inductor L1 will maintain the value of the current that flows through itself, inductor L1 releases stored electromagnetic energy. The released electromagnetic energy is superimposed on the current output from converter 18 to main positive bus MPL. Consequently, electric power supplied from power storage unit 10 is output after it is boosted by a voltage value corresponding to the electromagnetic energy stored in inductor L1.

On the other hand, during the down-conversion operation, converter ECU 30 (FIG. 1) turns ON/OFF transistor Q1B at a prescribed duty ratio and maintains transistor Q1A in the OFF state (Duty=0%).

While transistor Q1B is in the ON state, a current path from main positive bus MPL to the positive electrode side of power storage unit 10 is formed. On the other hand, when transistor Q1B makes transition from the ON state to the OFF state (non-conducting state), that current path is opened and the current is cut off. In other words, as it is only a period of time when transistor Q1B is in the ON state that electric power is supplied from main positive bus MPL to power storage unit 10, an average voltage of DC electric power supplied from converter 18 to power storage unit 10 is equal to a value obtained by multiplying a voltage value across main positive bus MPL and main negative bus MNL (bus voltage value Vc) by the duty ratio.

As the configuration and the operation of converter 28 are also similar to those of converter 18 described above, detailed description will not be repeated.

(Outline of Electric Power Management)

Electric power supply to the drive force generation unit and the auxiliary machinery group according to the present first embodiment will be described hereinafter with reference to FIGS. 3A to 6B. As described above, in the present first embodiment, a converter to operate as "master" can freely be selected, and in addition, even when any of power storage units 10 and 20 is disconnected from power supply system 100, electric power supply to the drive force generation unit and the auxiliary machinery group should be continued.

In the description below, the following four cases will separately be described, for each converter to operate as "master" and for each power storage unit disconnected from power supply system 100:

(1) A case where power storage unit 10 is disconnected while converter 18 is operating as "master";

(2) A case where power storage unit 10 is disconnected while converter 28 is operating as "master";

(3) A case where power storage unit 20 is disconnected while converter 18 is operating as "master"; and (4) A case where power storage unit 20 is disconnected while converter 28 is operating as "master".

<Case 1>

FIGS. 3A and 3B are diagrams showing outlines (case 1) of electric power supply to the drive force generation unit and the auxiliary machinery group according to the first embodiment of the present invention. FIG. 3A shows a case where power storage units 10 and 20 are in a normal condition, while FIG. 3B shows a case where a fault condition takes place in power storage unit 10.

Referring to FIG. 3A, if power storage units 10 and 20 are both in a normal condition, system relays SMR1 and SMR2 are maintained in the ON state. Thus, discharge electric power Pb1 is discharged from power storage unit 10, a part thereof is supplied to the auxiliary machinery group, and the remaining part thereof is supplied to the drive force generation unit. In addition, discharge electric power Pb2 from power storage unit 20 is supplied to the drive force generation unit in its entirety. Therefore, relation of $$\text{discharge electric power } Pb1 + \text{discharge electric power } Pb2 = \text{supply electric power } Pc + \text{supply electric power } Ps$$

$$\text{discharge electric power } Pb1 > \text{supply electric power } Ps$$

is satisfied between supply electric power Pc and Ps supplied to the drive force generation unit and the auxiliary machinery group respectively and discharge electric power Pb1 and Pb2 discharged from power storage units 10 and 20.

Here, in order to stabilize a voltage value of supply electric power Pc supplied to the drive force generation unit, that is, a voltage value across main positive bus MPL and main negative bus MNL (bus voltage value Vc), converter 18 operating as "master" performs the voltage conversion operation in accordance with the voltage control mode (boost). Namely, converter 18 is controlled such that bus voltage value Vc attains to a prescribed voltage target value Vc*. On the other hand, converter 28 operating as "slave" performs a boost operation in accordance with the electric power control mode in order to achieve electric power allotment between power storage units 10 and 20 (electric power management). Namely, converter 28 is controlled such that a value of electric power supplied and received between corresponding power storage unit 20 and main positive bus MPL, main negative bus MNL attains to a prescribed electric power target value Pb2*. As discharge electric power Pb2 from power storage unit 20 can thus arbitrarily be adjusted, discharge electric power Pb1 from power storage unit 10 can also indirectly be controlled.

Here, a voltage value of supply electric power Ps supplied to the auxiliary machinery group through low-voltage positive line LPL and low-voltage negative line LNL fluctuates depending on SOC or the like of power storage unit 10. Inverter 72 (FIG. 1) included in air-conditioning apparatus 70 or down converter 80, however, has a voltage adjustment function. Therefore, even when prescribed voltage fluctuation occurs in power storage unit 10, the auxiliary machinery group can normally operate.

Here, if some kind of fault condition occurs in power storage unit 10, system relay SMR1 is driven to the OFF state as shown in FIG. 3B and power storage unit 10 is electrically disconnected from power supply system 100. When power storage unit 10 is electrically disconnected, electric power cannot be supplied from power storage unit 10 to the auxiliary machinery group. Therefore, the control mode in converters 18 and 28 should be switched such that electric power can be supplied from power storage unit 20 to the auxiliary machinery group.

In the present first embodiment, for example, a configuration for switching converters 18 and 28 to the conducting mode will be described. Specifically, when power storage unit 10 is disconnected from power supply system 100, converters 18 and 28 stop the voltage conversion operation and maintain the electrically conducting state between power storage units 10, 20 and main positive bus MPL, main negative bus MNL, respectively.

Then, discharge electric power Pb2 from power storage unit 20 is supplied to main positive bus MPL, main negative bus MNL through corresponding converter 28. A part of discharge electric power Pb2 is supplied to the drive force generation unit and the remaining part thereof is supplied to the auxiliary machinery group through converter 18 and low-voltage positive line LPL, low-voltage negative line LNL. Thus, even after power storage unit 10 is electrically disconnected from power supply system 100, electric power supply to the drive force generation unit and the auxiliary machinery group is continued. Here, relation of $$\text{discharge electric power } Pb2 = \text{supply electric power } Pc + \text{supply electric power}$$

is satisfied between discharge electric power Pb2 discharged from power storage unit 20 and supply electric power Pc and Ps supplied to the drive force generation unit and the auxiliary machinery group respectively.

<Case 2>

FIGS. 4A and 4B are diagrams showing outlines (case 2) of electric power supply to the drive force generation unit and the auxiliary machinery group according to the first embodiment of the present invention. FIG. 4A shows a case where power storage units 10 and 20 are in a normal condition, while FIG. 4B shows a case where a fault condition takes place in power storage unit 10.

Referring to FIG. 4A, as in FIG. 3A above, if power storage units 10 and 20 are both in a normal condition, system relays SMR1 and SMR2 are maintained in the ON state. Thus, discharge electric power Pb1 is discharged from power storage unit 10, a part thereof is supplied to the auxiliary machinery group, and the remaining part thereof is supplied to the drive force generation unit. In addition, discharge electric power Pb2 from power storage unit 20 is supplied to the drive force generation unit in its entirety.

In the case shown in FIG. 4A, converter 28 operates as "master", and converter 18 operates as "slave". Namely, converter 28 operating as "master" is controlled such that bus voltage value Vc attains to prescribed voltage target value Vc*. On the other hand, converter 18 operating as "slave" is controlled such that a value of electric power supplied and received between corresponding power storage unit 10 and main positive bus MPL, main negative bus MNL attains to a prescribed electric power target value Pb1*.

Here, if some kind of fault condition occurs in power storage unit 10, system relay SMR1 is driven to the OFF state as shown in FIG. 4B and power storage unit 10 is electrically disconnected from power supply system 100. In this case, as in FIG. 3B, converters 18 and 28 stop the voltage conversion operation and maintain the electrically conducting state between power storage units 10, 20 and main positive bus MPL, main negative bus MNL, respectively.

Then, discharge electric power Pb2 from power storage unit 20 is supplied to main positive bus MPL, main negative bus MNL through converter 28. A part of discharge electric power Pb2 is supplied to the drive force generation unit and the remaining part thereof is supplied to the auxiliary machinery group through converter 18 and low-voltage positive line LPL, low-voltage negative line LNL. Thus, even after power storage unit 10 is electrically disconnected from power supply system 100, electric power supply to the drive force generation unit and the auxiliary machinery group is continued.

<Case 3>

Figure 5A:
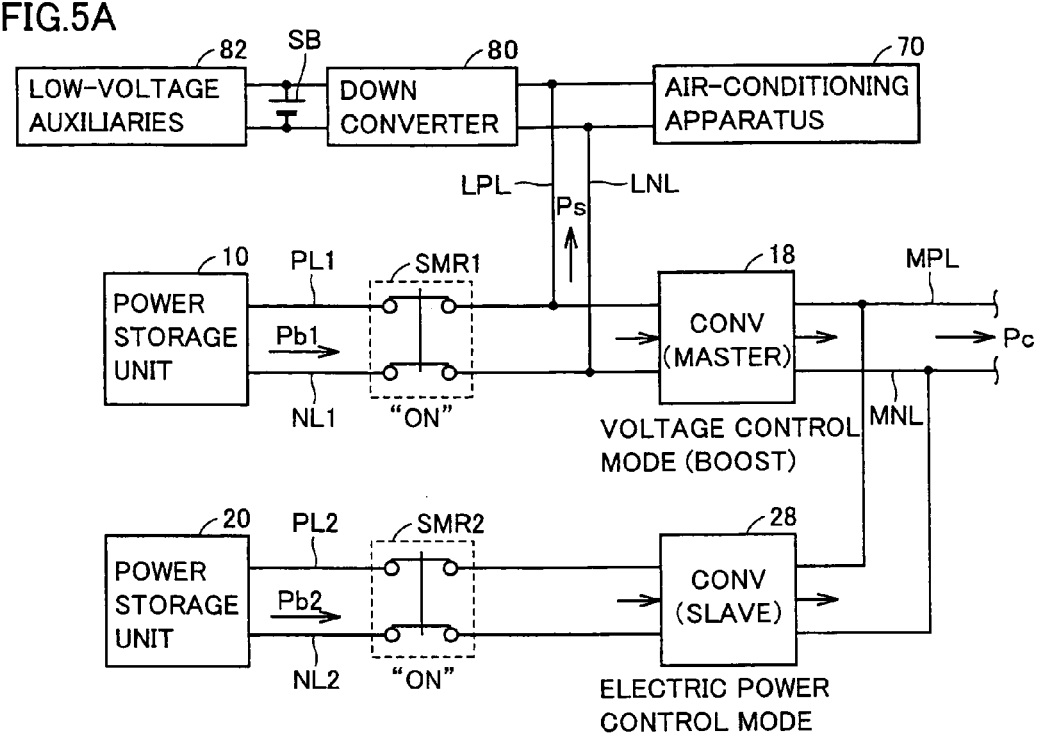
FIGS. 5A and 5B are diagrams showing outlines (case 3) of electric power supply to the drive force generation unit and the auxiliary machinery group according to the first embodiment of the present invention.
Figure 5B:
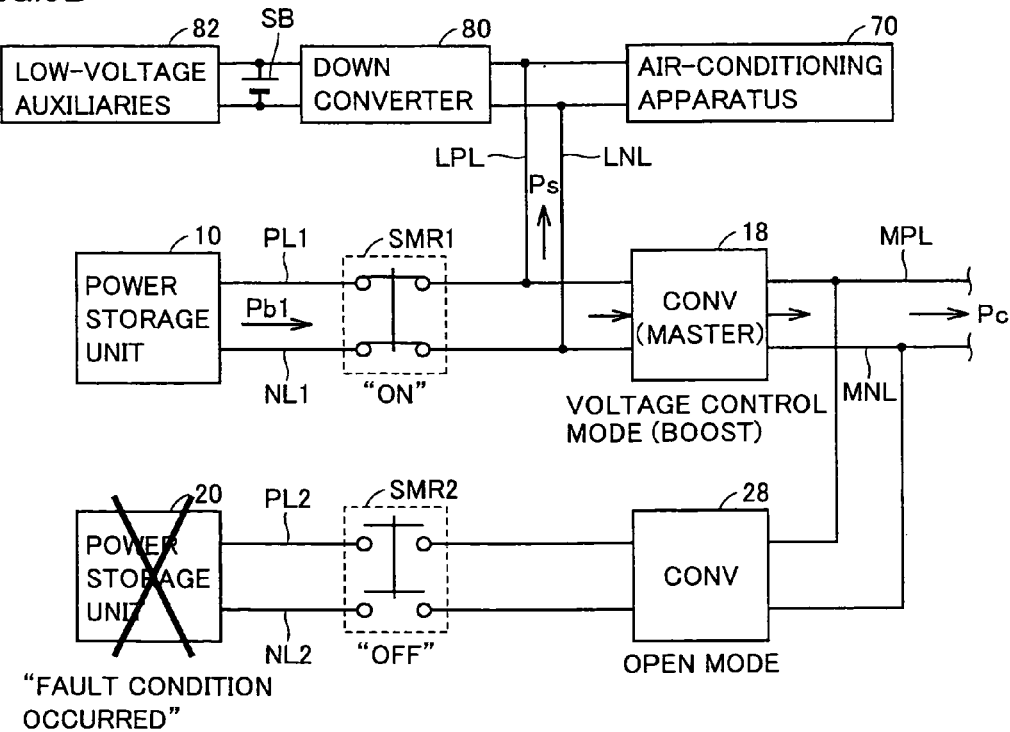

FIGS. 5A and 5B are diagrams showing outlines (case 3) of electric power supply to the drive force generation unit and the auxiliary machinery group according to the first embodiment of the present invention. FIG. 5A shows a case where power storage units 10 and 20 are in a normal condition, while FIG. 5B shows a case where a fault condition takes place in power storage unit 20.

Referring to FIG. 5A, as in FIG. 3A above, if power storage units 10 and 20 are both in a normal condition, system relays SMR1 and SMR2 are maintained in the ON state. Thus, discharge electric power Pb1 is discharged from power storage unit 10, a part thereof is supplied to the auxiliary machinery group, and the remaining part thereof is supplied to the drive force generation unit. In addition, discharge electric power Pb2 from power storage unit 20 is supplied to the drive force generation unit in its entirety.

In the case shown in FIG. 5A, as in FIG. 3A, converter 18 operates as "master", and converter 28 operates as "slave". Namely, converter 18 operating as "master" is controlled such that bus voltage value Vc attains to prescribed voltage target value Vc*. On the other hand, converter 28 operating as "slave" is controlled such that a value of electric power supplied and received between corresponding power storage unit 20 and main positive bus MPL, main negative bus MNL attains to prescribed electric power target value Pb2*.

Here, if some kind of fault condition occurs in power storage unit 20, system relay SMR2 is driven to the OFF state as shown in FIG. 5B and power storage unit 20 is electrically disconnected from power supply system 100. In this case, converter 28 stops the voltage conversion operation and sets an electrically open state between system relay SMR2 and main positive bus MPL, main negative bus MNL. Namely, the control mode of converter 28 is switched from the voltage control mode (boost) to an open mode.

On the other hand, as converter 18 operating as "master" is performing the voltage conversion operation in accordance with the voltage control mode (boost), bus voltage value Vc across main positive bus MPL and main negative bus MNL can continuously be stabilized without being affected by disconnection of power storage unit 20 from power supply system 100 or switching of the control mode of converter 28. Thus, even after power storage unit 20 is electrically disconnected from power supply system 100, electric power supply to the drive force generation unit and the auxiliary machinery group is continued by using electric power from power storage unit 10.

<Case 4>

Figure 6A:
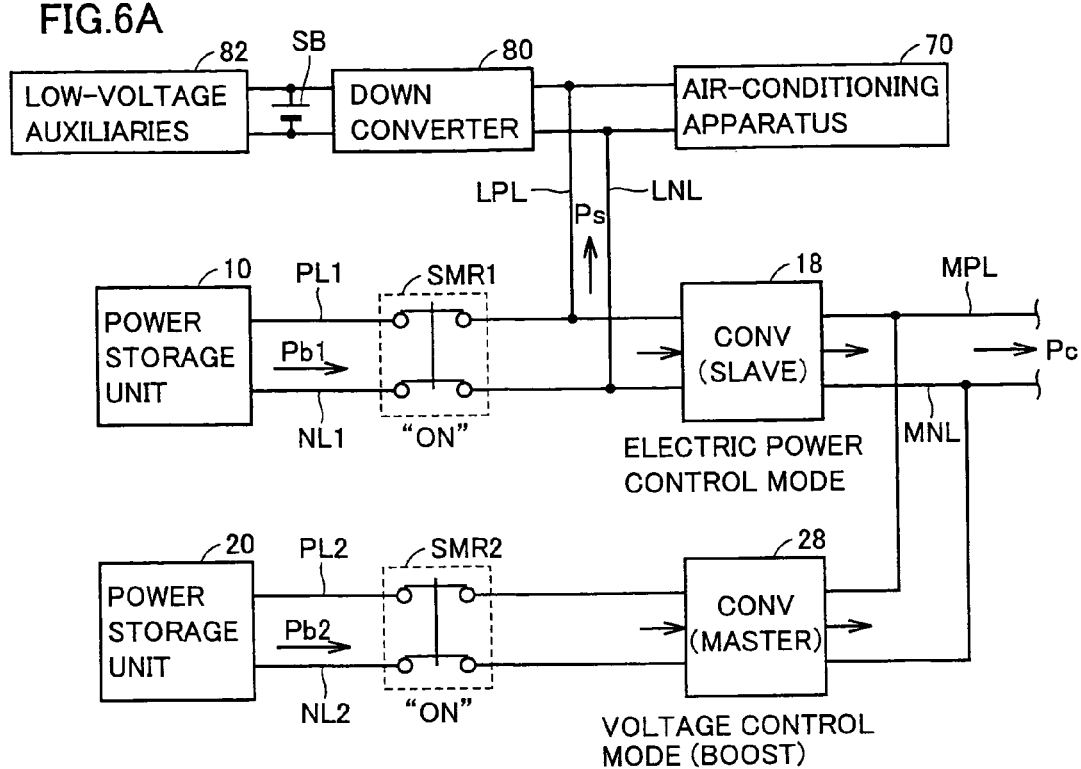
FIGS. 6A and 6B are diagrams showing outlines (case 4) of electric power supply to the drive force generation unit and the auxiliary machinery group according to the first embodiment of the present invention.
Figure 6B:
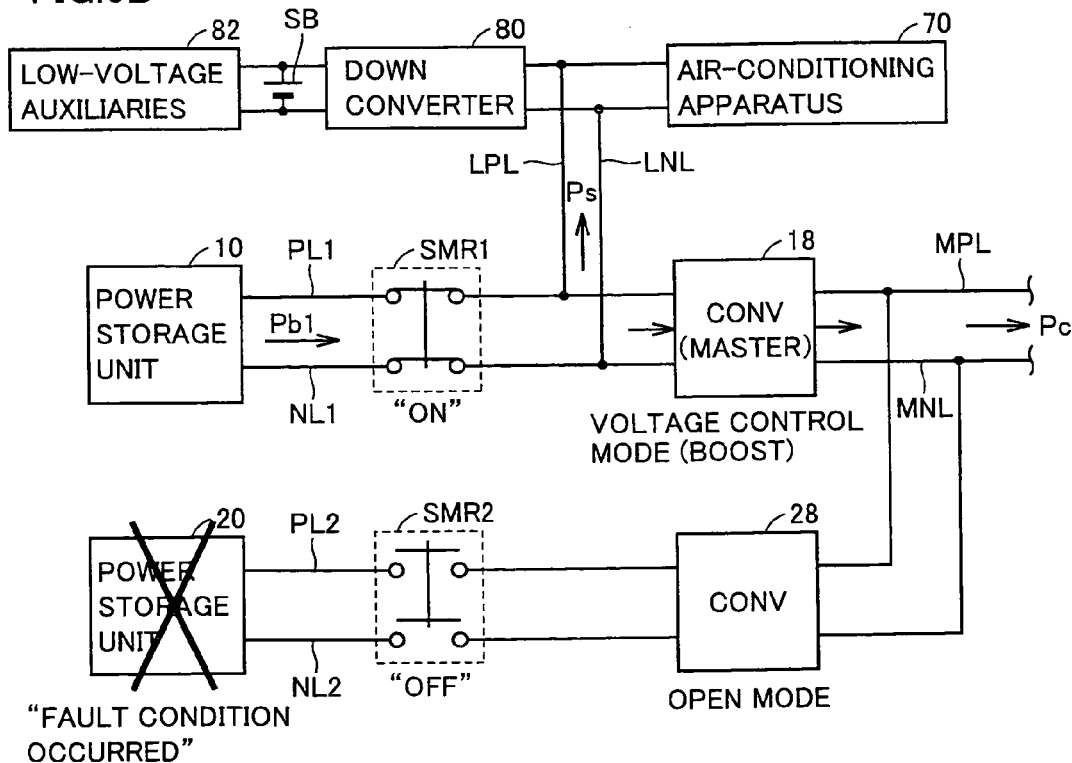

FIGS. 6A and 6B are diagrams showing outlines (case 4) of electric power supply to the drive force generation unit and the auxiliary machinery group according to the first embodiment of the present invention. FIG. 6A shows a case where power storage units 10 and 20 are in a normal condition, while FIG. 6B shows a case where a fault condition takes place in power storage unit 20.

Referring to FIG. 6A, as in FIG. 3A above, if power storage units 10 and 20 are both in a normal condition, system relays SMR1 and SMR2 are maintained in the ON state. Thus, discharge electric power Pb1 is discharged from power storage unit 10, a part thereof is supplied to the auxiliary machinery group, and the remaining part thereof is supplied to the drive force generation unit. In addition, discharge electric power Pb2 from power storage unit 20 is supplied to the drive force generation unit in its entirety. In the case shown in FIG. 6A, as in FIG. 4A, converter 28 operates as "master", and converter 18 operates as "slave". Namely, converter 28 operating as "master" is controlled such that bus voltage value Vc attains to prescribed voltage target value Vc*. On the other hand, converter 18 operating as "slave" is controlled such that a value of electric power supplied and received between corresponding power storage unit 10 and main positive bus MPL, main negative bus MNL attains to prescribed electric power target value Pb1*.

Here, if some kind of fault condition occurs in power storage unit 20, system relay SMR2 is driven to the OFF state as shown in FIG. 6B and power storage unit 20 is electrically disconnected from power supply system 100. In this case, converter 28 stops the voltage conversion operation and sets an electrically open state between system relay SMR2 and main positive bus MPL, main negative bus MNL. Namely, the control mode of converter 28 is switched from the voltage control mode (boost) to the open mode.

As the control mode of converter 28 is switched, bus voltage value Vc across main positive bus MPL and main negative bus MNL cannot be stabilized. Therefore, converter 18 operating as "slave" is switched to operate as "master". Namely, the control mode of converter 18 is switched from the electric power control mode to the voltage control mode (boost). Thus, even after power storage unit 20 is electrically disconnected from power supply system 100, electric power supply to the drive force generation unit and the auxiliary machinery group is continued by using electric power from power storage unit 10, while bus voltage value Vc across main positive bus MPL and main negative bus MNL is stabilized.

(Operating State of Converter in Conducting Mode)

Figure 7:
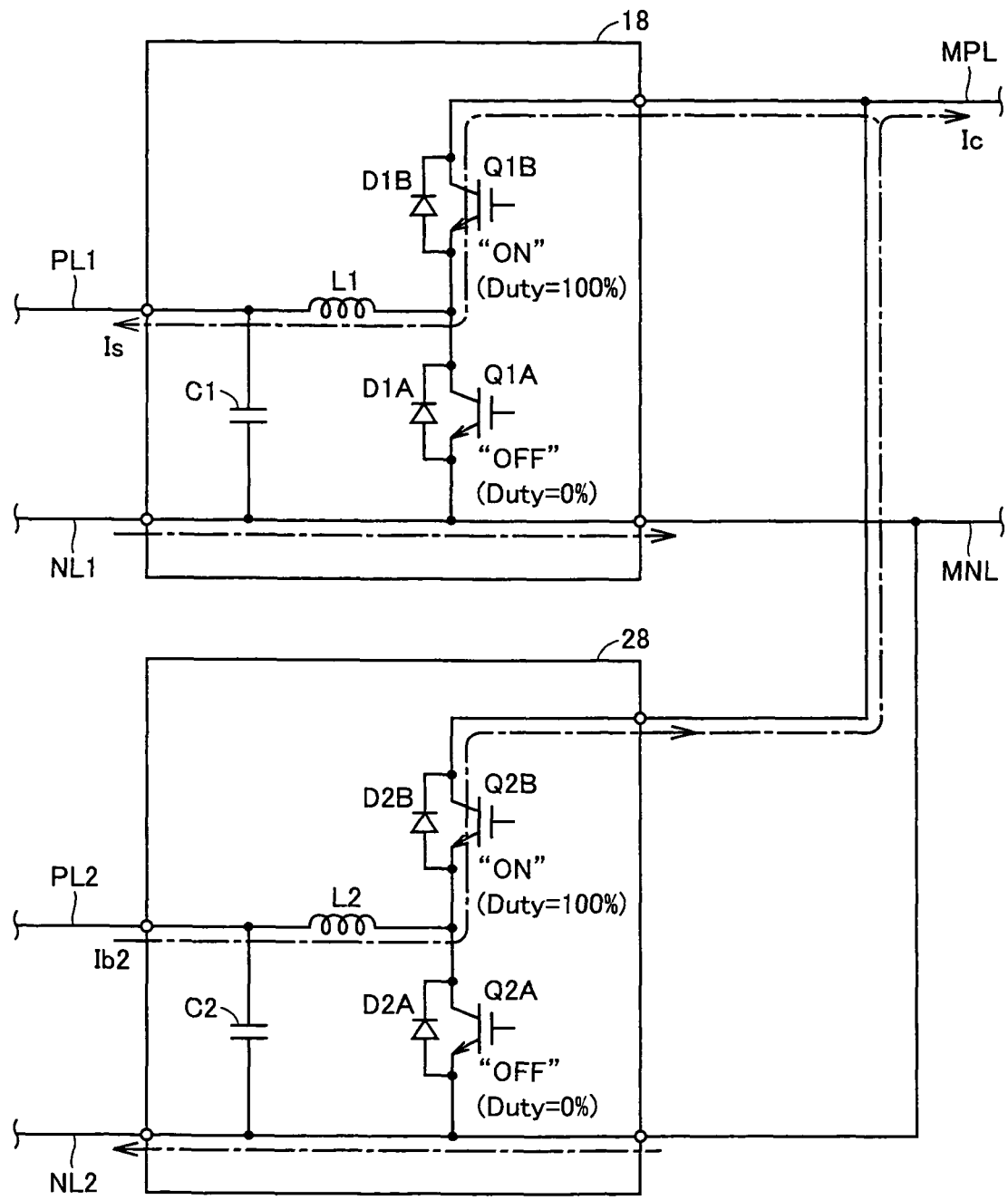
FIG. 7 is a diagram showing a state of operation of the converter in a conducting mode shown in FIGS. 3B and 4B.

FIG. 7 is a diagram showing a state of operation of converters 18, 28 in the conducting mode shown in FIGS. 3B and 4B.

Referring to FIG. 7, transistors Q1B and Q2B connected to main positive bus MPL in converters 18 and 28 respectively are both maintained in the ON state. Specifically, a switching instruction indicating the duty ratio of 100% is given from converter ECU 30 (FIG. 1) to transistors Q1B and Q2B. On the other hand, transistors Q1A and Q2A connected to main negative bus MNL in converters 18 and 28 respectively are both maintained in the OFF state. Specifically, a switching instruction indicating the duty ratio of 0% is given from converter ECU 30 (FIG. 1) to transistors Q1A and Q2A.

Consequently, positive line PL1 is electrically connected to main positive bus MPL through inductor L1 and transistor Q1B, and negative line NL1 is directly connected to main negative bus MNL. In addition, positive line PL2 is electrically connected to main positive bus MPL through an inductor L2 and transistor Q2B, and negative line NL2 is directly connected to main negative bus MNL.

Accordingly, from the viewpoint of power storage unit 20 (FIG. 1), two current paths, that is, a current path through converter 28 to the drive force generation unit and a current path through converter 28 and converter 18 to the auxiliary machinery group are formed.

As described above, converters 18 and 28 are configured with a chopper-type circuit. Therefore, unlike the trans-type circuit, the "conducting mode" can be implemented. Specifically, converters 18 and 28 are non-insulating-type voltage conversion circuits and an electrically conducting state between an input side and an output side can readily be established by maintaining a transistor on a current path in the ON state. On the other hand, in a voltage conversion unit configured with a trans-type circuit as in down converter 80 (FIG. 1), a winding transformer insulates the input side and the output side from each other, and hence it is difficult to implement the "conducting mode" as in the present embodiment.

(Control Structure in Battery ECU)

A control structure for implementing switching between the control modes as above will be described hereinafter in detail.

Figure 8:
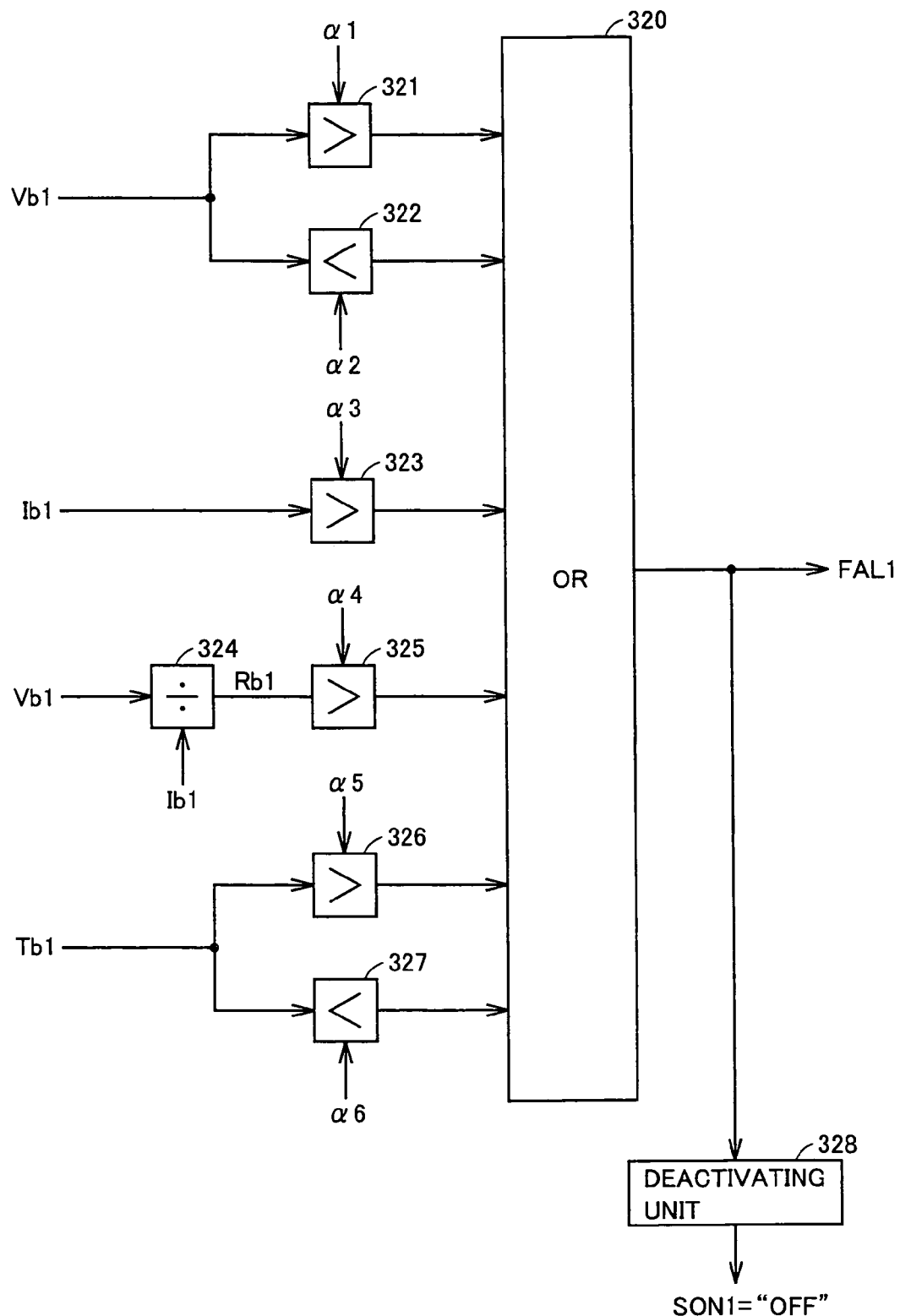
FIG. 8 is a block diagram showing a control structure in a battery ECU for detecting a fault condition of a power storage unit.
Figure 9:
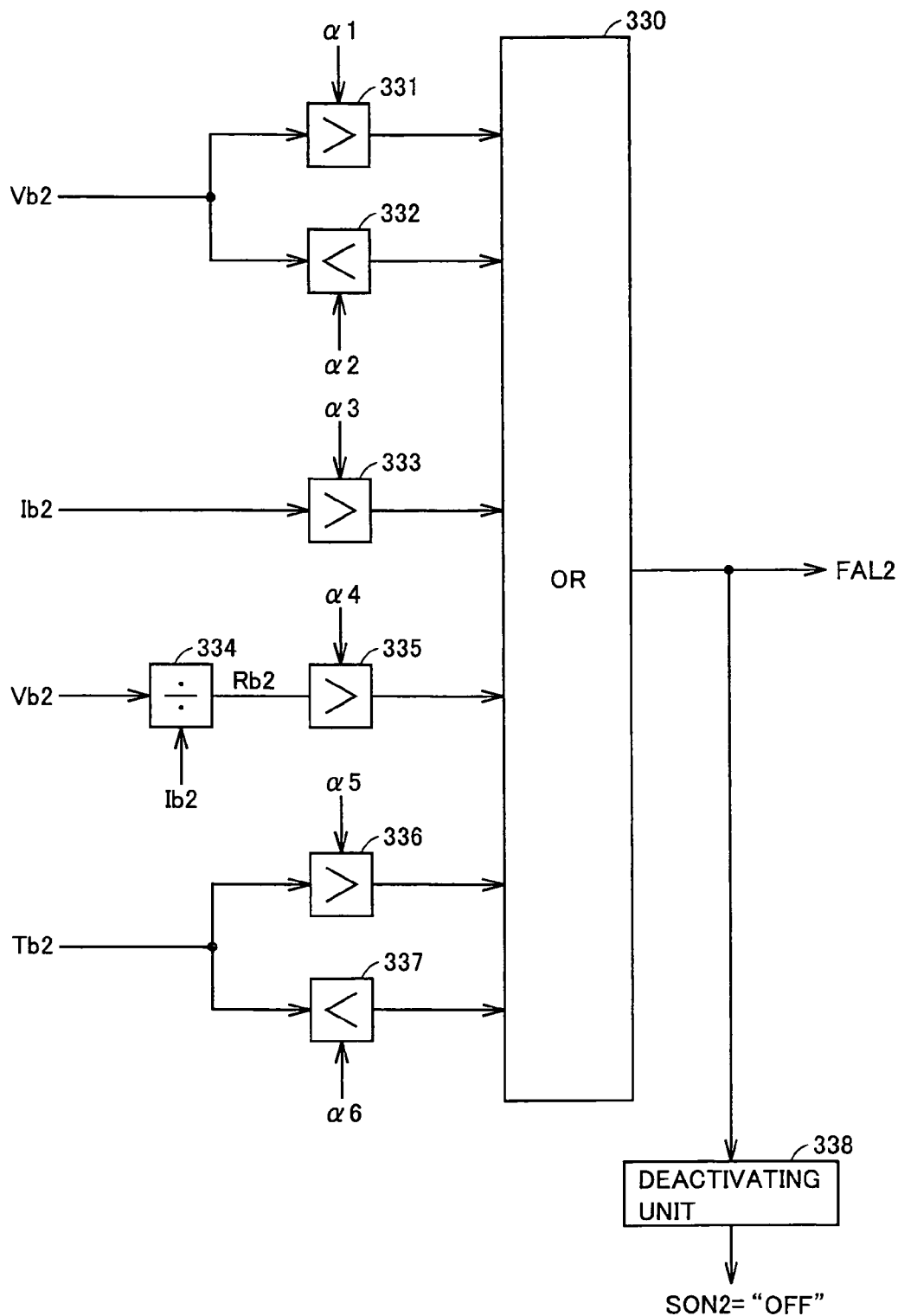
FIG. 9 is a block diagram showing a control structure in the battery ECU for detecting a fault condition of the power storage unit.

FIG. 8 is a block diagram showing a control structure in battery ECU 32 for detecting a fault condition of power storage unit 10. FIG. 9 is a block diagram showing a control structure in battery ECU 32 for detecting a fault condition of power storage unit 20.

Referring to FIG. 8, battery ECU 32 detects a fault condition of power storage unit 10 based on temperature Tb1, voltage value Vb1, current value Ib1, and an internal resistance value. It is not necessary to use all of four determination elements consisting of temperature Tb1, voltage value Vb1, current value Ib1, and the internal resistance value. Namely, at least one of these determination elements should only be included, and another determination element may be added.

A control structure of battery ECU 32 includes a logical sum unit 320, a deactivating unit 328, comparison units 321, 322, 323, 325, 326, and 327, and a division unit 324.

Logical sum unit 320 operates the logical sum of a result of determination based on each determination element which will be described later and issues a fault condition detection signal FAL1 for notification of the fault condition in power storage unit 10. Specifically, when an output from any of comparison units 321, 322, 323, 325, 326, and 327 which will be described later is activated, logical sum unit 320 outputs fault condition detection signal FAL1 to the outside as well as to deactivating unit 328.

Deactivating unit 328 sets system ON instruction SON1 to inactive (OFF) in response to fault condition detection signal FALL. Then, system relay SMR1 (FIG. 1) is driven to the OFF state and power storage unit 10 is electrically disconnected from power supply system 100.

Comparison units 321 and 322 are units for monitoring voltage value Vb1 of power storage unit 10, and determines whether voltage value Vb1 is within a prescribed voltage value range or not (a threshold voltage value $\alpha 2 < Vb1 <$ a threshold voltage value $\alpha 1$). Specifically, comparison unit 321 activates the output when voltage value Vb1 exceeds threshold voltage value α1. Alternatively, comparison unit 322 activates the output when voltage value Vb1 is lower than threshold voltage value α2.

Comparison unit 323 is a unit for monitoring current value Ib1 of power storage unit 10 and determines whether an excessive current flows in power storage unit 10 or not. Specifically, comparison unit 323 activates the output when current value Ib1 exceeds a threshold current value α3.

Division unit 324 and comparison unit 325 are units for monitoring the internal resistance value of power storage unit 10 and determines whether the internal resistance value has excessively increased or not due to deterioration. Specifically, division unit 324 calculates an internal resistance value Rb1 by dividing voltage value Vb1 of power storage unit 10 by current value Ib1 thereof, and comparison unit 325 determines whether calculated internal resistance value Rb1 has exceeded a threshold resistance value α4 or not. Then, comparison unit 325 activates the output when the internal resistance value exceeds threshold resistance value α4.

Comparison units 326 and 327 are units for monitoring temperature Tb1 of power storage unit 10, and determines whether temperature Tb1 is within a prescribed temperature range or not (a threshold temperature α6<Tb1< a threshold temperature α5). Specifically, comparison unit 326 activates the output when temperature Tb1 exceeds threshold temperature a5, and comparison unit 327 activates the output when temperature Tb1 is lower than threshold temperature α6.

Referring to FIG. 9, battery ECU 32 further detects a fault condition of power storage unit 20 based on temperature Tb2, voltage value Vb2, current value Ib2, and an internal resistance value. It is not necessary to use all of four determination elements consisting of temperature Tb2, voltage value Vb2, current value Ib2, and the internal resistance value. Namely, at least one of these determination elements should only be included, and another determination element may be added.

The control structure of battery ECU 32 further includes a logical sum unit 330, a deactivating unit 338, comparison units 331, 332, 333, 335, 336, and 337, and a division unit 334. As a function of each of these units is the same as that of logical sum unit 320, deactivating unit 328, comparison units 321, 322, 323, 325, 326, and 327, and division unit 324, detailed description will not be repeated.

It is noted that threshold values α1 to α6 shown in FIGS. 8 and 9 can experimentally be obtained in advance or they may be set based on a design value of power storage units 10, 20. If power storage unit 10 and power storage unit 20 are different from each other in characteristics, threshold values α1 to α6 shown in FIGS. 8 and 9 may be different therebetween.

(Control Structure in Converter ECU)

Figure 10:
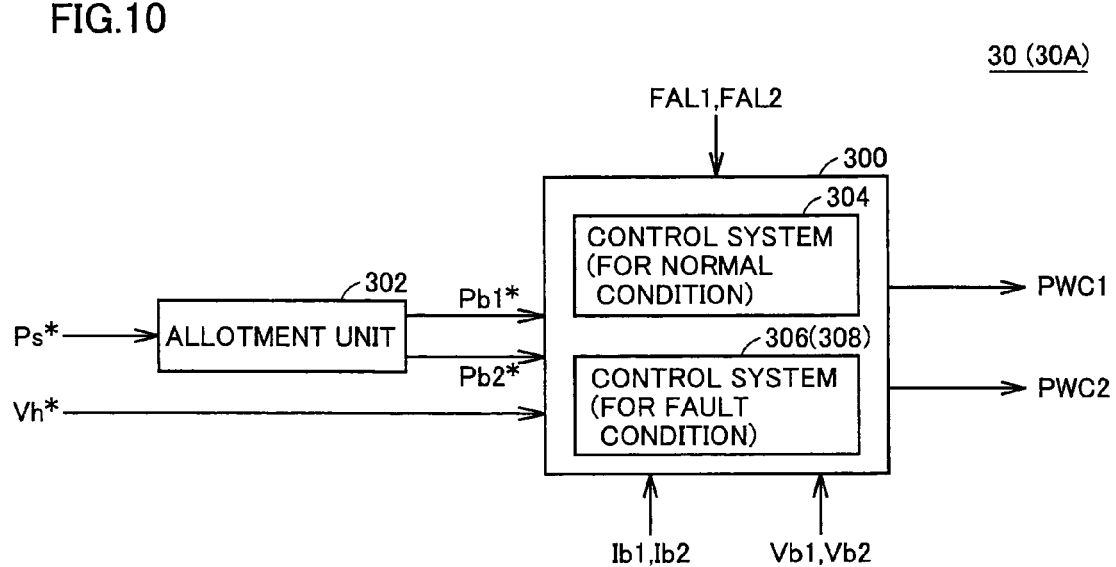
FIG. 10 is a block diagram showing a control structure involved with generation of a switching instruction in a converter ECU.

FIG. 10 is a block diagram showing a control structure involved with generation of switching instructions PWC1, PWC2 in converter ECU 30.

Referring to FIG. 10, the control structure of converter ECU 30 includes a switching instruction generation unit 300 and an allotment unit 302.

Switching instruction generation unit 300 generates switching instructions PWC1, PWC2 for controlling the voltage conversion operation of converters 18, 28 in accordance with electric power target values Pb1*, Pb2*, a voltage target value Vh*, and the like. In addition, switching instruction generation unit 300 includes a control system (for normal condition) 304 and a control system (for fault condition) 306, and activates any one of them in response to fault condition detection signals FAL1 (FIG. 8), FAL2 (FIG. 9) from battery ECU 32. Each of control system (for normal condition) 304 and control system (for fault condition) 306 generates switching instructions PWC1, PWC2 in accordance with a predetermined control mode, based on current values Ib2, voltage values Vb1, Vb2, and the like.

Allotment unit 302 divides requested electric power Ps* from drive ECU 50 (FIG. 1) into electric power target values Pb1*, Pb2* to be allotted to power storage units 10, 20 respectively and provides the target values to switching instruction generation unit 300. Here, allotment unit 302 determines a ratio of division based on SOCs (not shown) or the like of power storage units 10, 20 provided from battery ECU 32 (FIG. 1).

FIG. 11 is a block diagram showing a control structure of control system (for normal condition) 304 corresponding to FIGS. 3A and 5A.

In the operation state shown in FIGS. 3A and 5A, if power storage units 10 and 12 are both in a normal condition, converter 18 is controlled in accordance with the "voltage control mode (boost)" and converter 28 is controlled in accordance with the "electric power control mode."

Referring to FIGS. 2 and 11, a control structure of control system (for normal condition) 304 includes modulation units (MOD) 402, 404, a division unit 410, subtraction units 412, 416, and a PI control unit 414 as a configuration for controlling converter 18 in accordance with the "voltage control mode (boost)."

Modulation unit 402 generates second switching instruction PWC1B for driving transistor Q1B (FIG. 2) of converter 18 in accordance with a given duty ratio instruction. Specifically, modulation unit 402 generates second switching instruction PWC1B by comparing the duty ratio instruction with carrier wave generated by a not-shown oscillation unit. As transistor Q1B (FIG. 2) is maintained in the ON state when converter 18 performs the voltage conversion operation in accordance with the "voltage control mode (boost)," "1" (100%) is input to modulation unit 402.

Modulation unit 404 generates first switching instruction PWC1A for driving transistor Q1A (FIG. 2) of converter 18 in accordance with a duty ratio instruction provided from subtraction unit 416 as will be described later.

Subtraction unit 416 subtracts a PI output from PI control unit 414 from a theoretical duty ratio from division unit 410 and provides the result as the duty ratio instruction to modulation unit 404.

Division unit 410 calculates the theoretical duty ratio (=Vb1/Vc*) corresponding to a boost ratio of converter 18 by dividing voltage value Vb1 of power storage unit 10 by voltage target value Vc* and outputs the result to subtraction unit 416. Namely, division unit 410 generates a feedforward component for implementing the "voltage control mode (boost)."

Subtraction unit 412 calculates voltage deviation ΔVc of bus voltage value Vc from voltage target value Vc* and provides the result to PI control unit 414. PI control unit 414 generates a PI output complying with voltage deviation ΔVc based on prescribed proportional gain and integral gain and outputs the same to subtraction unit 416.

Specifically, PI control unit 414 includes a proportional element (P) 418, an integral element (I) 420, and an addition unit 422. Proportional element 418 multiplies voltage deviation ΔVc by prescribed proportional gain Kp1 and outputs the result to addition unit 422, and integral element 420 integrates voltage deviation ΔVc with respect to prescribed integral gain Ki1 (integral time: 1/Ki1) and outputs the result to addition unit 422. Then, addition unit 422 adds outputs from proportional element 418 and integral element 420 and generates the PI output. The PI output corresponds to a feedback component for implementing the "voltage control mode (boost)."

In addition, a control structure of control system (for normal condition) 304 includes modulation units (MOD) 406,

408, a division unit 430, a multiplication unit 434, subtraction units 432, 438, and a PI control unit 436 as a configuration for controlling converter 28 in accordance with the "electric power control mode."

Modulation unit 406 generates a second switching instruction PWC2B for driving transistor Q2B (FIG. 2) of converter 28. As modulation unit 406 is otherwise the same as modulation unit 402 described above, detailed description will not be repeated.

Modulation unit 408 generates a first switching instruction PWC2A for driving transistor Q2A (FIG. 2) of converter 28 in accordance with a duty ratio instruction provided from subtraction unit 438 as will be described later. Subtraction unit 438 subtracts a PI output from PI control unit 436 from a theoretical duty ratio from division unit 430 and provides the result as the duty ratio instruction to modulation unit 408.

Division unit 430 calculates the theoretical duty ratio (=Vb2/Vc*) corresponding to a boost ratio of converter 28 by dividing voltage value Vb2 of power storage unit 20 by voltage target value Vc* as in division unit 410 described above and outputs the result to subtraction unit 438.

Multiplication unit 434 calculates discharge electric power Pb2 from power storage unit 20 by multiplying current value Ib2 by voltage value Vb2. Then, subtraction unit 432 calculates electric power deviation ΔPb2 of discharge electric power Pb2 calculated by multiplication unit 434 from electric power target value Pb2* and provides the result to PI control unit 436. Namely, the configuration in the "voltage control mode (boost)" described above is such that the voltage deviation is provided to the PI control unit, whereas the configuration in the "electric power control mode" is such that the electric power deviation is provided to the PI control unit.

PI control unit 436 generates the PI output complying with electric power deviation ΔPb1 based on prescribed proportional gain Kp2 and integral gain Ki2, and outputs the same to subtraction unit 438. In addition, PI control unit 436 includes a proportional element 440, an integral element 442, and an addition unit 444. As functions of these units are the same as those in PI control unit 414 described above, detailed description will not be repeated.

FIG. 12 is a block diagram showing a control structure of control system (for normal condition) 304 corresponding to FIGS. 4A and 6A.

In the operation state shown in FIGS. 4A and 6A, if power storage units 10 and 12 are both in a normal condition, converter 18 is controlled in accordance with the "electric power control mode" and converter 28 is controlled in accordance with the "voltage control mode (boost)."

Referring to FIG. 12, the control structure of control system (for normal condition) 304 further includes modulation units (MOD) 402, 404, division unit 410, a multiplication unit 474, subtraction units 472, 416, and PI control unit 414 as a configuration for controlling converter 18 in accordance with the "electric power control mode." As a function of each of these units is the same as that of modulation units (MOD) 406, 408, division unit 430, multiplication unit 434, subtraction units 432, 438, and PI control unit 436 in FIG. 11 above, detailed description will not be repeated.

In addition, the control structure of control system (for normal condition) 304 further includes modulation units (MOD) 406, 408, division unit 430, subtraction units 482, 438, and PI control unit 436 as a configuration for controlling converter 28 in accordance with the "voltage control mode (boost)." As a function of each of these units is the same as that of modulation units (MOD) 402, 404, division unit 410, subtraction units 412, 416, and PI control unit 414 in FIG. 11 above, detailed description will not be repeated.

FIG. 13 is a block diagram showing a control structure of control system (for fault condition) 306 corresponding to FIGS. 3B and 4B.

Referring to FIGS. 8 and 10, if a fault condition occurs in power storage unit 10 and power storage unit 10 is electrically disconnected from power supply system 100, control system (for fault condition) 306 is activated. Referring to FIGS. 7 and 13, in control system (for fault condition) 306, "1" (Duty=100%) is provided to both of modulation units 402 and 406 and "0" (Duty=0%) is provided to both of modulation units 404 and 408. Consequently, in converters 18 and 28, transistors Q1B and Q2B are maintained in the ON state and transistors Q1A and Q2A are maintained in the OFF state.

FIG. 14 is a block diagram showing a control structure of control system (for fault condition) 306 corresponding to FIGS. 5B and 6B.

As shown in FIGS. 9 and 10, if a fault condition occurs in power storage unit 20 and power storage unit 20 is electrically disconnected from power supply system 100, control system (for fault condition) 306 is activated. In control system (for fault condition) 306, converter 18 is controlled in accordance with the control structure similar to that of control system (for normal condition) 304 shown in FIG. 11. Namely, referring to FIG. 14, the control structure of control system (for fault condition) 306 includes modulation units (MOD) 402, 404, division unit 410, subtraction units 412, 416, and PI control unit 414 as a configuration for controlling converter 18 in accordance with the "voltage control mode (boost)." As the function of each of these units has been described above, detailed description will not be repeated.

In contrast, converter 28 is controlled to enter the "open mode". Specifically, in control system (for fault condition) 306, "0" (Duty=0%) is provided to modulation units 406 and 408. Therefore, transistors Q2A and Q2B of converter 28 are maintained in the OFF state. Consequently, converter 28 sets an electrically open state between system relay SMR2 and main positive bus MPL, main negative bus MNL.

(Process Flow)

Figure 15:
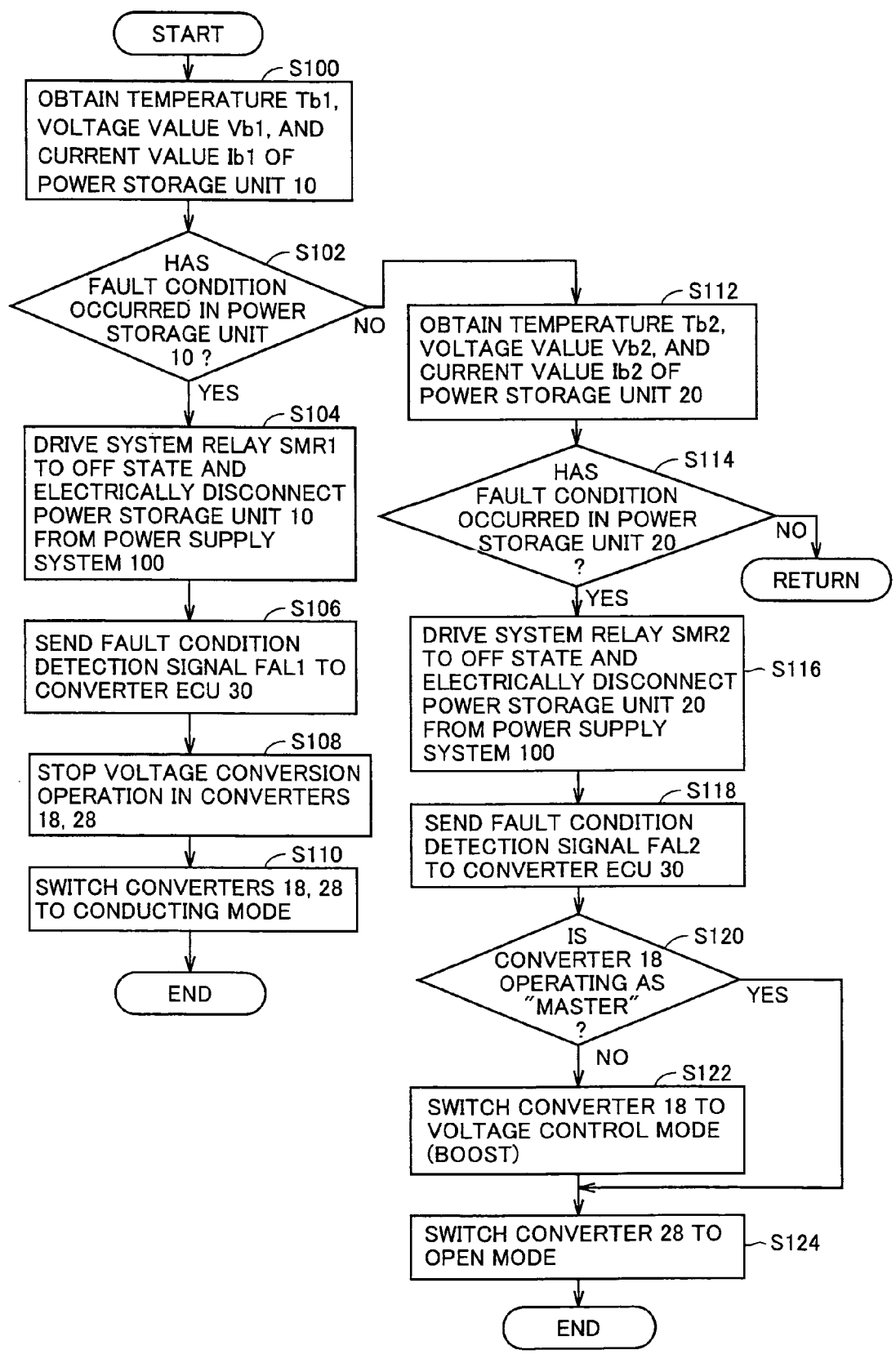
FIG. 15 is a flowchart of a method of controlling the power supply system according to the first embodiment of the present invention.

FIG. 15 is a flowchart of a method of controlling power supply system 100 according to the first embodiment of the present invention. It is noted that the flowchart shown in FIG. 15 can be implemented by execution of one or more program stored in advance by converter ECU 30 and battery ECU 32.

Referring to FIG. 15, battery ECU 32 obtains temperature Tb1, voltage value Vb1 and current value Ib1 of power storage unit 10 (step S100). Then, battery ECU 32 calculates internal resistance value Rb1 of power storage unit 10 from voltage value Vb1 and current value Ib1, and determines whether a fault condition has occurred in power storage unit 10 or not based on temperature Tb1, voltage value Vb1, current value Ib1, internal resistance value Rb1, and the like of power storage unit 10 (step S102). Namely, whether power storage unit 10 should electrically be disconnected or not is determined.

If a fault condition has occurred in power storage unit 10 (YES in step S102), that is, if power storage unit 10 should electrically be disconnected, battery ECU 32 drives system relay SMR1 to the OFF state and electrically disconnects power storage unit 10 from power supply system 100 (step S104). At the same time, battery ECU 32 transmits fault condition detection signal FAL1 to converter ECU 30 (step S106).

In response to fault condition detection signal FAL1 from battery ECU 32, converter ECU 30 stops the voltage conversion operation in converters 18 and 28 (step S108) and switches converters 18 and 28 to the conducting mode (step S110). Then, the process ends.

In contrast, if there is no fault condition in power storage unit 10 (NO in step S102), battery ECU 32 obtains temperature Tb2, voltage value Vb2 and current value Ib2 of power storage unit 20 (step S112). Then, battery ECU 32 calculates an internal resistance value Rb2 of power storage unit 20 from voltage value Vb2 and current value Ib2, and determines whether a fault condition has occurred in power storage unit 20 or not based on temperature Tb2, voltage value Vb2, current value Ib2, internal resistance value Rb2, and the like of power storage unit 20 (step S114). Namely, whether power storage unit 20 should electrically be disconnected or not is determined.

If a fault condition has occurred in power storage unit 20 (YES in step S114), that is, if power storage unit 20 should electrically be disconnected, battery ECU 32 drives system relay SMR2 to the OFF state and electrically disconnects power storage unit 20 from power supply system 100 (step S116). At the same time, battery ECU 32 transmits fault condition detection signal FAL2 to converter ECU 30 (step S118).

In response to fault condition detection signal FAL2 from battery ECU 32, converter ECU 30 determines whether converter 18 is operating as "master" or not (step S120). If converter 18 is not operating as "master" (NO in step S120), converter 18 is switched to the voltage control mode (boost) to operate as "master" (step S122).

Further, after converter 18 is switched to the voltage control mode (boost) (after step S122 is performed) or if converter 18 is operating as "master" (YES in step S120), converter ECU 30 switches converter 28 to the open mode (step S124). Then, the process ends.

In contrast, if there is no fault condition in power storage unit 20 (NO in step S114), that is, if it is not necessary to electrically disconnect power storage unit 20, the process returns to the initial step.

According to the first embodiment of the present invention, when a fault condition occurs in power storage unit 10 and power storage unit 10 is electrically disconnected from power supply system 100, converters 18 and 28 are both set to the conducting mode. Thus, electric power is supplied from power storage unit 20 through main positive bus MPL, main negative bus MNL to the drive force generation unit and a part of electric power supplied to main positive bus MPL, main negative bus MNL is supplied to the auxiliary machinery group.

Alternatively, when a fault condition occurs in power storage unit 20 and power storage unit 20 is electrically disconnected from power supply system 100, converter 18 is set to the voltage control mode (boost) and converter 28 is set to the open mode. Thus, electric power is supplied from power storage unit 10 through main positive bus MPL, main negative bus MNL to the drive force generation unit and electric power is supplied through low-voltage positive line LPL and low-voltage negative line LNL to the auxiliary machinery group.

Thus, even though any one of power storage units 10 and 20 is electrically disconnected from power supply system 100, electric power supply to the drive force generation unit and the auxiliary machinery group can be continued.

In addition, according to the first embodiment of the present invention, when any one of power storage units 10 and 20 is electrically disconnected from power supply system 100, converters 18 and 28 both stop the electric power conversion operation, and hence switching loss involved with electric power supply from the corresponding power storage unit to main positive bus MPL, main negative bus MNL can be reduced. Therefore, even though a value of current that flows through converter 28 becomes relatively high along with electric power supply only from power storage unit 20, unnecessary generation of loss can be suppressed.

[Variation of First Embodiment]

In the present first embodiment, the power supply system including two power storage units has been described, however, expansion to a power supply system including three or more power storage units is also similarly applicable.

Figure 16:
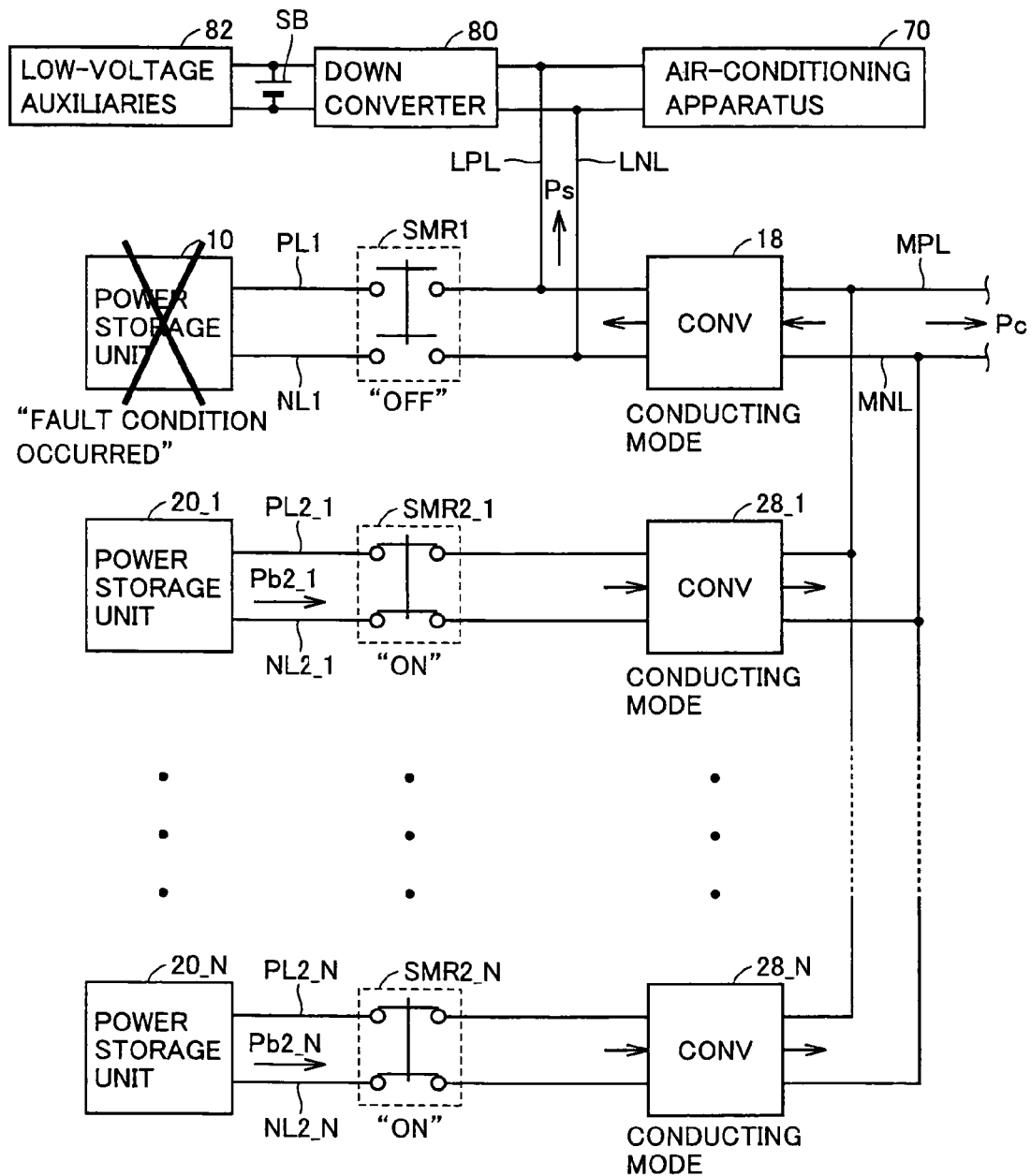
FIG. 16 is a diagram showing outlines of electric power supply to the drive force generation unit and the auxiliary machinery group according to a variation of the first embodiment of the present invention.

FIG. 16 is a diagram showing outlines of electric power supply to the drive force generation unit and the auxiliary machinery group according to a variation of the first embodiment of the present invention.

Referring to FIG. 16, a power supply system according to the variation of the present first embodiment representatively includes converter 18 operating as "master" and converters 28_1 to 28_N operating as "slave". In correspondence with converters 28_1 to 28_N, power storage units 20_1 to 20_N and system relays SMR2_1 to SMR2_N are provided. If all of power storage unit 10 and power storage units 20_1 to 20_N are in a normal condition, converter 18 performs the boost operation in accordance with the voltage control mode (boost) and converters 28_1 to 28_N perform the boost operation in accordance with the electric power control mode.

Here, if a fault condition occurs in power storage unit 10 and power storage unit 10 is disconnected from the power supply system, all converters, that is, converter 18 and converters 28_1 to 28_N, are switched to the conducting mode. Consequently, as in the first embodiment described above, electric power supply to the drive force generation unit and the auxiliary machinery group is continued.

As the power supply system is otherwise the same as power supply system 100 according to the first embodiment, detailed description will not be repeated.

According to the variation of the first embodiment of the present invention, as the number of power storage units constituting the power supply system is not limited, an appropriate number of power storage units can be provided, depending on magnitude of an electric power capacity of the drive force generation unit and the auxiliary machinery group. Therefore, in addition to the effect in the first embodiment of the present invention described above, the power supply system having a power supply capacity variable in a flexible manner can be obtained.

Second Embodiment

In the first embodiment described above, when power storage unit 10 is disconnected from power supply system 100, electric power having a voltage substantially equal to voltage value Vb2 of power storage unit 20 is supplied to the drive force generation unit. Meanwhile, in order to be able to supply electric power having a higher voltage, the voltage conversion operation in converters 18 and 28 may positively be performed.

As the overall configuration of a power supply system according to the second embodiment of the present invention is the same as power supply system 100 according to the present first embodiment shown in FIG. 1, detailed description will not be repeated. Referring again to FIGS. 3B and 4B, in the present second embodiment, if some kind of fault condition occurs in power storage unit 10 and power storage unit 10 is electrically disconnected from power supply system 100, converter 28 is switched to the "voltage control mode (boost)" and converter 18 is switched to the "voltage control mode (down-conversion)."

Figure 17:
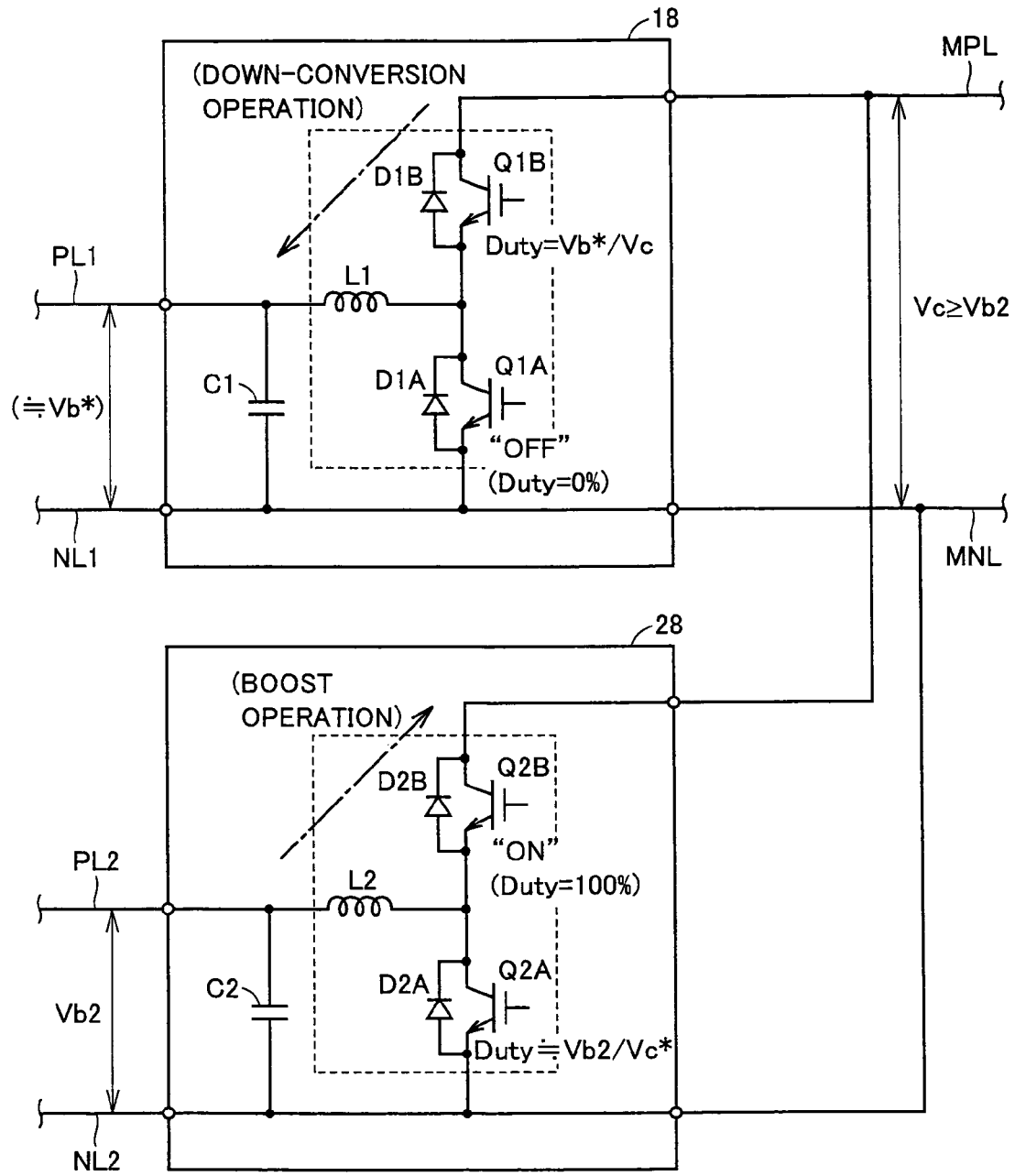
FIG. 17 is a diagram showing a state of operation of the converter in a voltage control mode (boost/down-conversion) shown in FIGS. 3B and 4B.

FIG. 17 is a diagram showing a state of operation of converters 18, 28 in the voltage control mode (boost/down-conversion) shown in FIGS. 3B and 4B.

Referring to FIG. 17, converter 28 supplies discharge electric power from corresponding power storage unit 20 to main positive bus MPL, main negative bus MNL after it is boosted such that the voltage value of the discharge electric power attains to prescribed voltage target value Vc*. On the other hand, converter 18 supplies a part of electric power that flows through main positive bus MPL, main negative bus MNL to the auxiliary machinery group through positive line PL1, negative line NL1 after it is down-converted such that the voltage value of the electric power attains to prescribed voltage target value Vb*.

As a result of such an operation, electric power having a voltage value substantially equal to that before disconnection of power storage unit 10 can be supplied to the drive force generation unit and electric power having voltage target value Vb* close to voltage value Vb1 of power storage unit 10 can be supplied to the auxiliary machinery group. Therefore, the drive force generation unit and the auxiliary machinery group can continue substantially the same operation, regardless of electrical disconnection of power storage unit 10.

More specifically, in converter 28 performing the boost operation, transistor Q2A performs the switching operation at a duty ratio in accordance with the boost ratio (=Vb2/Vc*) and transistor Q2B is maintained in the ON state (duty ratio=100%).

In addition, in converter 18 performing the down-conversion operation, transistor Q1A is maintained in the OFF state (duty ratio=0%) and transistor Q2B performs the switching operation at a duty ratio in accordance with a down-conversion ratio (=Vb*Nc).

(Control Structure in Converter ECU)

In a control structure in a converter ECU 30A according to the present second embodiment, a control system (for fault condition) 308 is provided instead of control System (for fault condition) 306 in converter ECU 30 according to the present first embodiment shown in FIG. 10. As the control structure is otherwise the same as in the first embodiment described above, detailed description will not be repeated.

FIG. 18 is a block diagram showing a control structure of control system (for fault condition) 308 corresponding to FIGS. 3B and 4B. It is noted that control system (for fault condition) 308 is activated when a fault condition occurs in power storage unit 10 and power storage unit 10 is electrically disconnected from the power supply system.

Referring to FIGS. 17 and 18, the control structure of control system (for fault condition) 308 includes modulation units (MOD) 402, 404 and a division unit 450 as a configuration for controlling converter 18 in accordance with the "voltage control mode (down-conversion)."

Division unit 450 calculates a theoretical duty ratio (=Vb*/Vc) corresponding to a down-conversion ratio in converter 18 by dividing voltage target value Vb* by bus voltage value Vc and outputs the duty ratio to modulation unit 402. Namely, division unit 450 generates a feedforward component for implementing the voltage conversion operation in accordance with the "voltage control mode (down-conversion)." Modulation unit 402 generates second switching instruction PWC1B for driving transistor Q1B (FIG. 11) of converter 18 in accordance with a signal output from division unit 450.

In addition, as "0" is provided to modulation unit 404, the duty ratio of first switching instruction PWC1A is fixed to 0% and transistor Q1A (FIG. 11) of converter 18 is maintained in the OFF state.

In addition, the control structure of control system (for fault condition) 308 includes modulation units (MOD) 406, 408, a division unit 452, subtraction units 454, 458, and a PI control unit 456 as a configuration for controlling converter 28 in accordance with the "voltage control mode (boost)."

Division unit 452 calculates a theoretical duty ratio (=Vb2/Vc*) corresponding to the boost ratio in converter 28 by dividing voltage value Vb2 of power storage unit 20 by voltage target value Vc* and outputs the duty ratio to subtraction unit 458. Namely, division unit 452 generates a feedforward component for implementing the boost operation in accordance with the "voltage control mode (boost)."

PI control unit 456 generates a PI output complying with voltage deviation AVc of bus voltage value Vc from voltage target value Vc* calculated by subtraction unit 454, based on prescribed proportional gain Kp3 and integral gain Ki3 and outputs the same to subtraction unit 458. The PI output corresponds to a feedback component for implementing the "voltage control mode (boost)." In addition, PI control unit 456 includes a proportional element 460, an integral element 462, and an addition unit 464. As these units are the same as those in PI control unit 414 described above, detailed description will not be repeated.

Subtraction unit 458 provides a value obtained by subtracting the PI output from PI control unit 456 from the theoretical duty ratio from division unit 452 to modulation unit 408 as the duty ratio instruction. Modulation unit 408 generates first switching instruction PWC2A for driving transistor Q2A (FIG. 17) in converter 28, in accordance with the output value from subtraction unit 458.

In addition, as "1" is provided to modulation unit 406, the duty ratio of second switching instruction PWC2B is fixed to 100% and transistor Q2B (FIG. 17) in converter 28 is maintained in the ON state.

As described above, switching from control system (for normal condition) 304 to control system (for fault condition) 308 is made in response to occurrence of the fault condition in power storage unit 10, so that the drive force generation unit and the auxiliary machinery group can continuously operate even after power storage unit 10 is electrically disconnected from the power supply system.

As the configuration is otherwise the same as in power supply system 100 according to the first embodiment described above, detailed description will not be repeated.

According to the second embodiment of the present invention, after power storage unit 10 is electrically disconnected from the power supply system, converter 28 performs the boost operation and converter 18 performs the down-conversion operation. Accordingly, electric power discharged from power storage unit 20 is supplied to the drive force generation unit after it is boosted by converter 28 and a part of electric power boosted by converter 28 is supplied to the auxiliary machinery group after it is down-converted by converter 18. Thus, voltage ranges electric power supplied to the drive force generation unit and the auxiliary machinery group are maintained in ranges the same as before power storage unit 10 is electrically disconnected. Therefore, even after power storage unit 10 is electrically disconnected, an operating range (speed range) of motor-generators MG1 and MG2 constituting the drive force generation unit can be ensured and hence running performance or the like of the vehicle can be maintained.

[Variation of Second Embodiment]

In the present second embodiment, the power supply system including two power storage units has been described, however, expansion to a power supply system including three or more power storage units is also similarly applicable.

Figure 19:
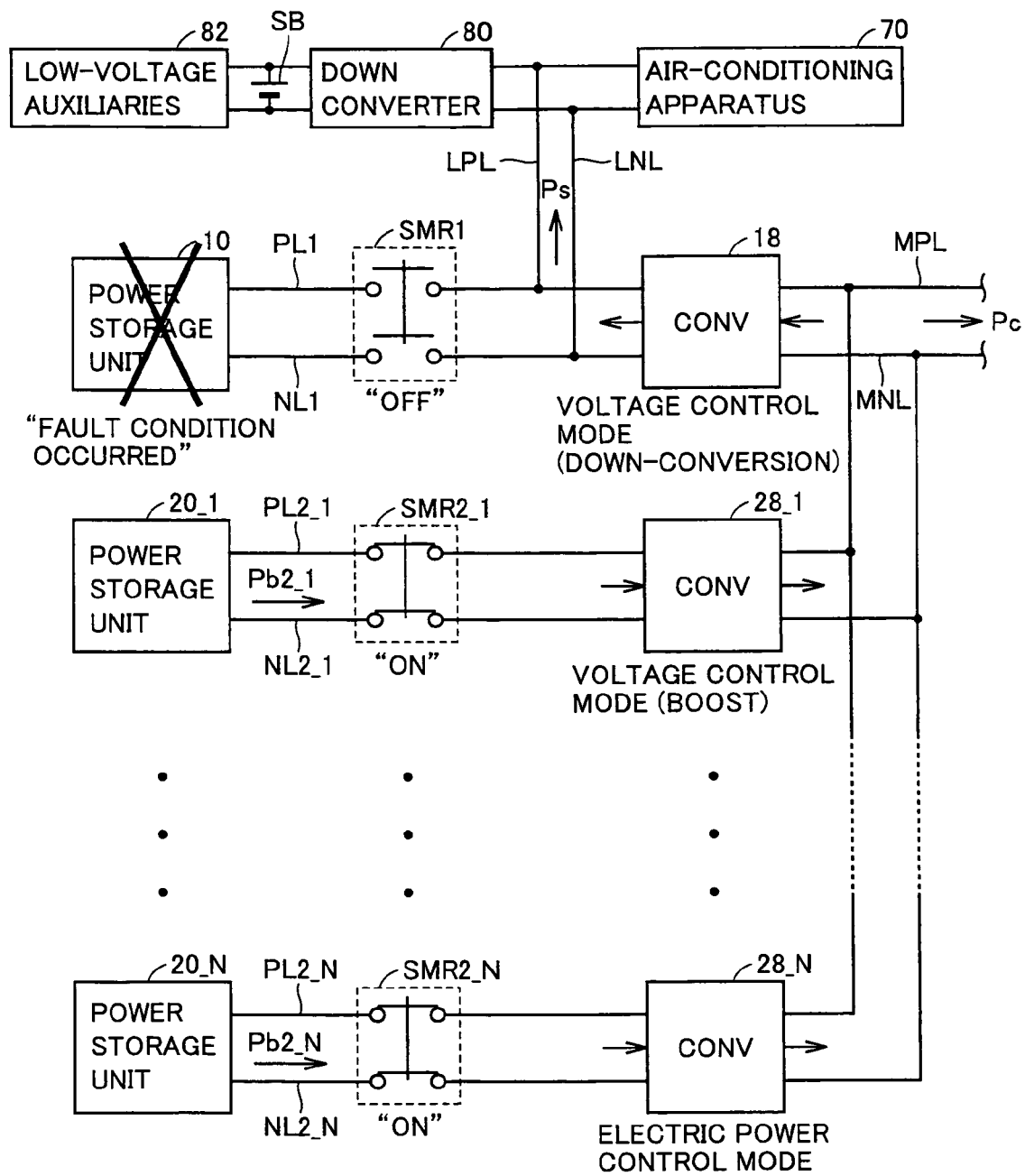
FIG. 19 is a diagram showing outlines of electric power supply to the drive force generation unit and the auxiliary machinery group according to a variation of a second embodiment of the present invention.

FIG. 19 is a diagram showing outlines of electric power supply to the drive force generation unit and the auxiliary machinery group according to a variation of a second embodiment of the present invention.

Referring to FIG. 19, a power supply system according to the variation of the present second embodiment includes converter 18 operating as "master" and converters 28_1 to 28_N operating as "slave", as in the power supply system according to the variation of the present first embodiment shown in FIG. 16. In correspondence with converters 28_1 to 28_N, power storage units 20_1 to 20_N and system relays SMR2_1 to SMR2_N are provided.

If all of power storage unit 10 and power storage units 20_1 to 20_N are in a normal condition, converter 18 performs the voltage conversion operation in accordance with the voltage control mode (boost) and converters 28_1 to 28_N perform the voltage conversion operation in accordance with the electric power control mode.

Here, if a fault condition occurs in power storage unit 10 and power storage unit 10 is disconnected from the power supply system, converter 18 is switched to the "voltage control mode (down-conversion)" and at least one of converters 28_1 to 28_N is switched to the "voltage control mode (boost)." This is done so that bus voltage value Vc supplied to the drive force generation unit is controllable and bus voltage value Vc is stabilized when any one converter performs the electric power conversion operation in accordance with the "voltage control mode (boost)." Though all of converters 28_1 to 28_N may be set to the "voltage control mode (boost)," from the viewpoint of electric power management in the overall power supply system, the number of converters maintained in the "electric power control mode" is desirably great.

As the power supply system is otherwise the same as the power supply system according to the second embodiment, detailed description will not be repeated.

According to the variation of the second embodiment of the present invention, as the number of power storage units constituting the power supply system is not limited, an appropriate number of power storage units can be provided, depending on magnitude of an electric power capacity of the drive force generation unit and the auxiliary machinery group. Therefore, in addition to the effect in the second embodiment of the present invention described above, the power supply system having a power supply capacity variable in a flexible manner can be obtained.

In the first and second embodiments of the present invention and the variations thereof, such a configuration that, when power storage unit 10 or 20 is in a fault condition, determination that the power storage unit in the fault condition should electrically be disconnected from the power supply system is made is illustrated, however, the present invention is not limited as such. For example, in such a manner of use that one power storage unit is successively selected from among a plurality of power storage units and each selected power storage unit is discharged to its limit in using a vehicle including the power supply system according to the present invention in the EV running mode, the power storage unit discharged to its limit should be disconnected from the power supply system. The power supply system according to the invention of the subject application is also applicable to such a manner of use.

In addition, in the first and second embodiments of the present invention and the variations thereof, a configuration including the drive force generation unit and the auxiliary machinery group is illustrated by way of example of the first and second load devices, however, the load device is not limited as such. Moreover, the power supply system according to the present invention is applicable to an apparatus having two types of load devices consuming electric power, in addition to an example where it is mounted on a vehicle.

In the invention of the subject application, even when the "first electric power line pair" is alternatively read as the "smoothing capacitor provided on the input side of the first load device," the technical concept thereof is essentially identical.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power supply system for supplying electric power to first and second load devices, comprising:
    a first electric power line pair electrically connected to said first load device;
    a plurality of rechargeable power storage units
    a plurality of voltage conversion units arranged corresponding to said plurality of power storage units respectively, said plurality of voltage conversion units being connected in parallel to said first electric power line pair and each being configured to perform a voltage conversion operation between said first electric power line pair and corresponding said power storage unit;
    a plurality of disconnection units arranged corresponding to said plurality of power storage units respectively, each for electrically disconnecting corresponding said power storage unit and corresponding said voltage conversion unit from each other;
    a second electric power line pair having one end electrically connected between a first voltage conversion unit representing one of said plurality of voltage conversion units and corresponding said disconnection unit and another end electrically connected to said second load device; and
    a control unit for controlling said plurality of voltage conversion units, when one disconnection unit among said plurality of disconnection units electrically disconnects corresponding said power storage unit and corresponding said voltage conversion unit from each other, such that electric power supply to said first load device and electric power supply to said second load device are continued through said first electric power line pair and through said second electric power line pair respectively by using electric power from remaining said power storage unit.

2. The power supply system according to claim 1, further comprising a fault condition detection unit for detecting a fault condition for each of said plurality of power storage units, wherein
    each of said plurality of disconnection units is configured to electrically disconnect corresponding said power storage unit and corresponding said voltage conversion unit from each other in response to detection of a fault condition in corresponding said power storage unit by said fault condition detection unit.

3. The power supply system according to claim 2, wherein said fault condition detection unit detects a fault condition of each of said plurality of power storage units based on at least one of a temperature, a voltage value, a current value, and an internal resistance value of corresponding said power storage unit.

4. The power supply system according to claim 1, wherein said control unit controls said voltage conversion unit corresponding to remaining said power storage unit such that electric power from said remaining power storage unit is supplied to said first load device through said first electric power line pair and controls said first voltage conversion unit such that electric power is supplied from said first electric power line pair through said second electric power line pair to said second load device, when said first voltage conversion unit and corresponding said power storage unit are electrically disconnected from each other by corresponding said disconnection unit.

5. The power supply system according to claim 4, wherein said control unit stops said voltage conversion operation between said first electric power line pair and corresponding said power storage unit and thereafter sets an electrically conducting state therebetween, for each of said plurality of voltage conversion units.

6. The power supply system according to claim 5, wherein each of said plurality of voltage conversion units includes
a switching element connected in series to an inductor and arranged between one electric power line out of said first electric power line pair and one electrode of corresponding said power storage unit, capable of electrically connecting and disconnecting said one electric power line and said one electrode of corresponding said power storage unit to/from each other, and
a line for electrically connecting another electric power line out of said first electric power line pair and another electrode of corresponding said power storage unit to each other, and
said control unit maintains said conducting state by setting said switching element to an ON state, for each of said plurality of voltage conversion units.

7. The power supply system according to claim 4, wherein said control unit controls remaining said voltage conversion unit except for said first voltage conversion unit such that electric power from corresponding said power storage unit is supplied to said first electric power line pair after it is boosted, and controls said first voltage conversion unit such that electric power from said first electric power line pair is supplied to said second load device after it is down-converted.

8. The power supply system according to claim 7, wherein said control unit controls said first voltage conversion unit in accordance with a first control mode for attaining a value of a down-converted voltage supplied to said second load device to a prescribed target value.

9. The power supply system according to claim 7, wherein said control unit controls at least one of said remaining voltage conversion units in accordance with a second control mode for attaining a value of a boosted voltage supplied to said first electric power line pair to a prescribed target value.

10. The power supply system according to claim 9, wherein while said first voltage conversion unit and corresponding said power storage unit are electrically connected to each other, said first voltage conversion unit is set to said second control mode to perform a voltage conversion operation, and each said remaining voltage conversion unit is set to a third control mode for attaining a value of electric power supplied and received between said first electric power line pair and corresponding said power storage unit to a prescribed target value to perform a voltage conversion operation, and
said control unit switches between the control modes for at least one of said remaining voltage conversion units and said first voltage conversion unit in response to electrical disconnection between said first voltage conversion unit and corresponding said power storage unit by corresponding said disconnection unit.

11. A vehicle, comprising:
a power supply system for supplying electric power to first and second load devices; and
a drive force generation unit for generating drive force for running as said first load device;
said power supply system including
a first electric power line pair electrically connected to said first load device,
a plurality of rechargeable power storage units,
a plurality of voltage conversion units arranged corresponding to said plurality of power storage units respectively, said plurality of voltage conversion units being connected in parallel to said first electric power line pair and each being configured to perform a voltage conversion operation between said first electric power line pair and corresponding said power storage unit,
a plurality of disconnection units arranged corresponding to said plurality of power storage units respectively, each for electrically disconnecting corresponding said power storage unit and corresponding said voltage conversion unit from each other,
a second electric power line pair having one end electrically connected between a first voltage conversion unit representing one of said plurality of voltage conversion units and corresponding said disconnection unit and another end electrically connected to said second load device, and
a control unit for controlling said plurality of voltage conversion units, when one disconnection unit among said plurality of disconnection units electrically disconnects corresponding said power storage unit and corresponding said voltage conversion unit from each other, such that electric power supply to said first load device and electric power supply to said second load device are continued through said first electric power line pair and through said second electric power line pair respectively by using electric power from remaining said power storage unit.

12. The vehicle according to claim 11, further comprising an auxiliary machinery group for vehicle as said second load device.

13. A method of controlling a power supply system for supplying electric power to first and second load devices, said power supply system including
a first electric power line pair electrically connected to said first load device,
a plurality of rechargeable power storage units,
a plurality of voltage conversion units arranged corresponding to said plurality of power storage units respectively, said plurality of voltage conversion units being connected in parallel to said first electric power line pair and each being configured to perform a voltage conversion operation between corresponding said power storage unit and said first electric power line pair,
a plurality of disconnection units arranged corresponding to said plurality of power storage units respectively, each for electrically disconnecting corresponding said power storage unit and corresponding said voltage conversion unit from each other, and
a second electric power line pair having one end electrically connected between a first voltage conversion unit representing one of said plurality of voltage conversion units and corresponding said disconnection unit and another end electrically connected to said second load device, said method comprising the steps of:

detecting whether a fault condition is present, for each of said plurality of power storage units;

electrically disconnecting, when the fault condition of any one power storage unit among said plurality of power storage units is detected, the power storage unit of which fault condition has been detected and corresponding said voltage conversion unit from each other by using corresponding said disconnection unit; and controlling said plurality of voltage conversion units such that electric power supply to said first load device and electric power supply to said second load device are continued through said first electric power line pair and through said second electric power line pair respectively by using electric power from remaining power storage unit except for disconnected said power storage unit.

* * * * *